United States Patent
Elshafie et al.

(10) Patent No.: US 12,082,122 B2
(45) Date of Patent: Sep. 3, 2024

(54) POWER CONTROL FOR ARTIFICIAL NOISE TRANSMISSION FOR PHYSICAL LAYER SECURITY

(71) Applicant: QUALCOMM Incorporated, San Diego, CA (US)

(72) Inventors: Ahmed Elshafie, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 17/444,537

(22) Filed: Aug. 5, 2021

(65) Prior Publication Data

US 2023/0037324 A1 Feb. 9, 2023

(51) Int. Cl.
*H04W 52/24* (2009.01)
*H04B 17/336* (2015.01)
*H04B 17/373* (2015.01)
*H04W 12/106* (2021.01)

(52) U.S. Cl.
CPC ........ *H04W 52/243* (2013.01); *H04B 17/336* (2015.01); *H04B 17/373* (2015.01); *H04W 12/106* (2021.01)

(58) Field of Classification Search
CPC ............. H04W 52/243; H04W 12/106; H04W 52/367; H04W 52/146; H04B 17/336; H04B 17/373
See application file for complete search history.

(56) References Cited

U.S. PATENT DOCUMENTS

2019/0149986 A1  5/2019  Luo et al.
2021/0373552 A1* 12/2021  Bhuyan ................... H04W 4/70

FOREIGN PATENT DOCUMENTS

CN   111542110 A   8/2020
CN   112564768 A   3/2021

OTHER PUBLICATIONS

KR20200078817 (Year: 2020).*
TR 202022629 (Year: 2020).*
CN111542110 (Year: 2020).*
International Search Report and Written Opinion—PCT/US2022/073914—ISA/EPO—Dec. 13, 2022.

(Continued)

*Primary Examiner* — Nishant Divecha
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration associated with artificial noise assisted physical layer security for at least one of an uplink channel or a sidelink channel. The UE may receive an indication of a power allocation parameter associated with a power allocation between a data signal and an artificial noise signal. The UE may transmit, via the uplink channel or the sidelink channel, at least one of the data signal or the artificial noise signal with the power allocation between the data signal and the artificial noise signal based at least in part on the power allocation parameter. Numerous other aspects are described.

30 Claims, 9 Drawing Sheets

(56) References Cited

OTHER PUBLICATIONS

Martin-Vega F.J., et al., "Key Technologies, Modeling Approaches, and Challenges for Millimeter-Wave Vehicular Communications", IEEE Communications Magazine, vol. 56, No. 10, Oct. 1, 2018, pp. 28-35, XP055530270, US, ISSN: 0163-6804, DOI: 10.1109/MCOM.2018.1800109, p. 32.
Partial International Search Report—PCT/US2022/073914—ISA/EPO—Oct. 21, 2022.
Xu W., et al., "Artificial Noise Assisted Secure Transmission for Uplink of Massive MIMO Systems", IEEE Transactions on Vehicular Technology, IEEE, USA, vol. 70, No. 7, May 19, 2021, XP011867274, pp. 6750-6762, ISSN: 0018-9545, DOI: 10.1109/TVT.2021.3081803 [retrieved on Jul. 21, 2021] section II.A, section III.B, figure 1.

* cited by examiner

POWER CONTROL FOR ARTIFICIAL NOISE TRANSMISSION FOR PHYSICAL LAYER SECURITY

FIELD OF THE DISCLOSURE

Aspects of the present disclosure generally relate to wireless communication and to techniques and apparatuses for power control for artificial noise transmission for physical layer security.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive a configuration associated with artificial noise assisted physical layer security for at least one of an uplink channel or a sidelink channel. The one or more processors may be configured to receive an indication of a power allocation parameter associated with a power allocation between a data signal and an artificial noise signal. The one or more processors may be configured to transmit, via the uplink channel or the sidelink channel, at least one of the data signal or the artificial noise signal with the power allocation between the data signal and the artificial noise signal based at least in part on the power allocation parameter.

Some aspects described herein relate to a base station for wireless communication. The base station may include a memory and one or more processors coupled to the memory. The one or more processors may be configured to transmit, to a UE, a configuration associated with artificial noise assisted physical layer security for at least one of an uplink channel or a sidelink channel. The one or more processors may be configured to transmit, to the UE, an indication of a power allocation parameter associated with a power allocation between transmitting a data signal on the uplink channel or the sidelink channel and transmitting an artificial noise signal to provide the artificial noise assisted physical layer security for the data signal.

Some aspects described herein relate to a method of wireless communication performed by a UE. The method may include receiving a configuration associated with artificial noise assisted physical layer security for at least one of an uplink channel or a sidelink channel. The method may include receiving an indication of a power allocation parameter associated with a power allocation between a data signal and an artificial noise signal. The method may include transmitting, via the uplink channel or the sidelink channel, at least one of the data signal or the artificial noise signal with the power allocation between the data signal and the artificial noise signal based at least in part on the power allocation parameter.

Some aspects described herein relate to a method of wireless communication performed by a base station. The method may include transmitting, to a UE, a configuration associated with artificial noise assisted physical layer security for at least one of an uplink channel or a sidelink channel. The method may include transmitting, to the UE, an indication of a power allocation parameter associated with a power allocation between transmitting a data signal on the uplink channel or the sidelink channel and transmitting an artificial noise signal to provide the artificial noise assisted physical layer security for the data signal.

Some aspects described herein relate to a non-transitory computer-readable medium that stores a set of instructions for wireless communication by a UE. The set of instructions, when executed by one or more processors of the UE, may cause the UE to receive a configuration associated with artificial noise assisted physical layer security for at least one of an uplink channel or a sidelink channel. The set of instructions, when executed by one or more processors of the UE, may cause the UE to receive an indication of a power allocation parameter associated with a power allocation between a data signal and an artificial noise signal. The set of instructions, when executed by one or more processors of the UE, may cause the UE to transmit, via the uplink channel or the sidelink channel, at least one of the data signal or the artificial noise signal with the power allocation between the data signal and the artificial noise signal based at least in part on the power allocation parameter.

Some aspects described herein relate to a non-transitory computer-readable medium that stores a set of instructions for wireless communication by a base station. The set of instructions, when executed by one or more processors of the base station, may cause the base station to transmit, to a UE, a configuration associated with artificial noise assisted physical layer security for at least one of an uplink channel or a sidelink channel. The set of instructions, when executed by one or more processors of the base station, may cause the base station to transmit, to the UE, an indication of a power allocation parameter associated with a power allocation between transmitting a data signal on the uplink channel or the sidelink channel and transmitting an artificial noise signal to provide the artificial noise assisted physical layer security for the data signal.

Some aspects described herein relate to an apparatus for wireless communication. The apparatus may include means for receiving a configuration associated with artificial noise assisted physical layer security for at least one of an uplink channel or a sidelink channel. The apparatus may include means for receiving an indication of a power allocation parameter associated with a power allocation between a data signal and an artificial noise signal. The apparatus may include means for transmitting, via the uplink channel or the sidelink channel, at least one of the data signal or the artificial noise signal with the power allocation between the data signal and the artificial noise signal based at least in part on the power allocation parameter.

Some aspects described herein relate to an apparatus for wireless communication. The apparatus may include means for transmitting, to a UE, a configuration associated with artificial noise assisted physical layer security for at least one of an uplink channel or a sidelink channel. The apparatus may include means for transmitting, to the UE, an indication of a power allocation parameter associated with a power allocation between transmitting a data signal on the uplink channel or the sidelink channel and transmitting an artificial noise signal to provide the artificial noise assisted physical layer security for the data signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
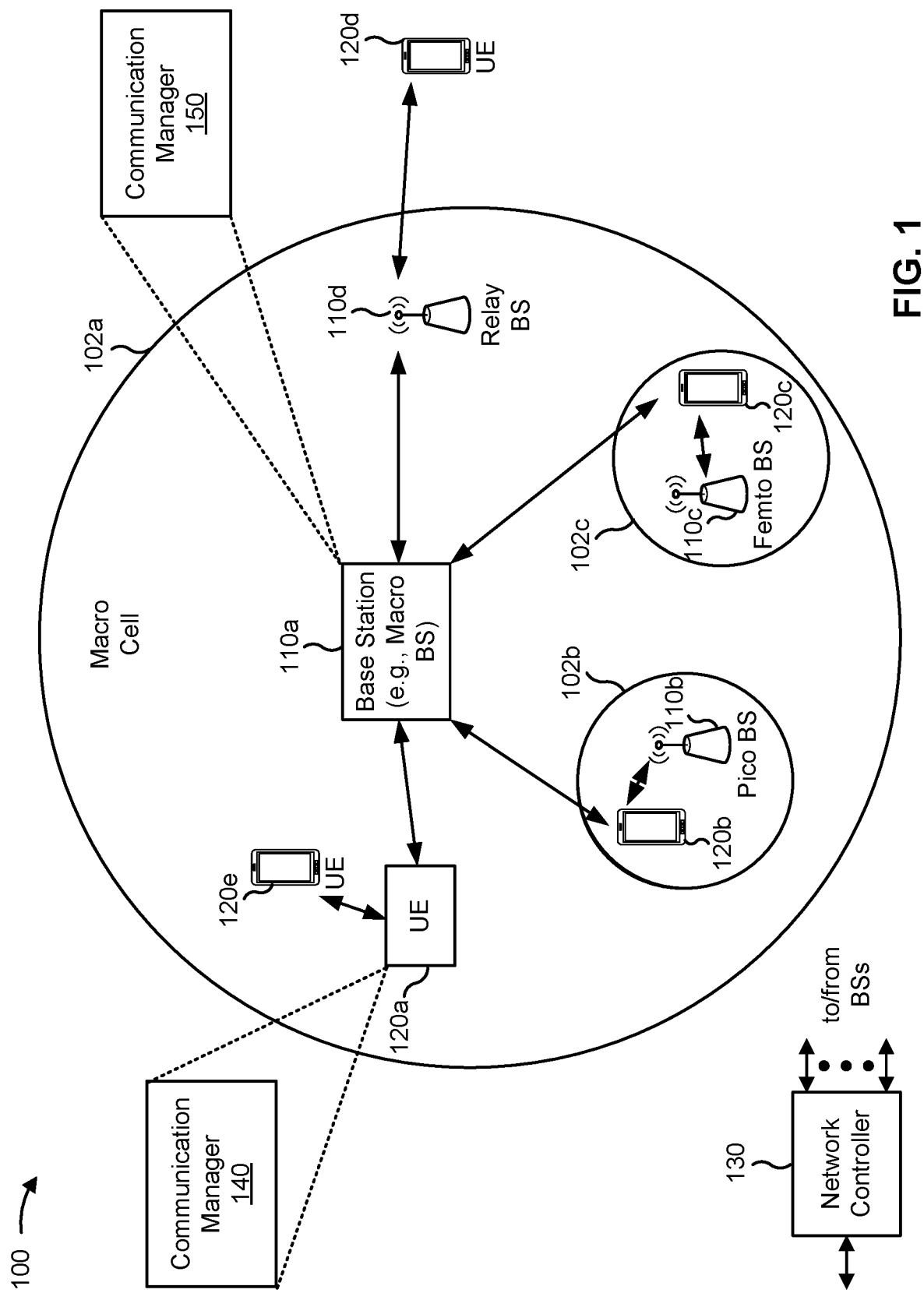
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration associated with artificial noise (AN) assisted physical layer security (PLS) for at least one of an uplink channel or a sidelink channel; receive an indication of a power allocation parameter associated with a power allocation between a data signal and an AN signal; and transmit, via the uplink channel or the sidelink channel, at least one of the data signal or the AN signal with the power allocation between the data signal and the AN signal based at least in part on the power allocation parameter. Additionally, or alternatively, the communication manager 140 may perform one or more other operations described herein.

In some aspects, the base station 110 may include a communication manager 150. As described in more detail elsewhere herein, the communication manager 150 may transmit, to a UE, a configuration associated with AN-assisted PLS for at least one of an uplink channel or a sidelink channel; and transmit, to the UE, an indication of a power allocation parameter associated with a power allocation between transmitting a data signal on the uplink channel or the sidelink channel and transmitting an AN signal to provide the AN-assisted PLS for the data signal. Additionally, or alternatively, the communication manager 150 may perform one or more other operations described herein.

As indicated above, FIG. 1 is provided as an example. Other examples may differ from what is described with regard to FIG. 1.

Figure 2:
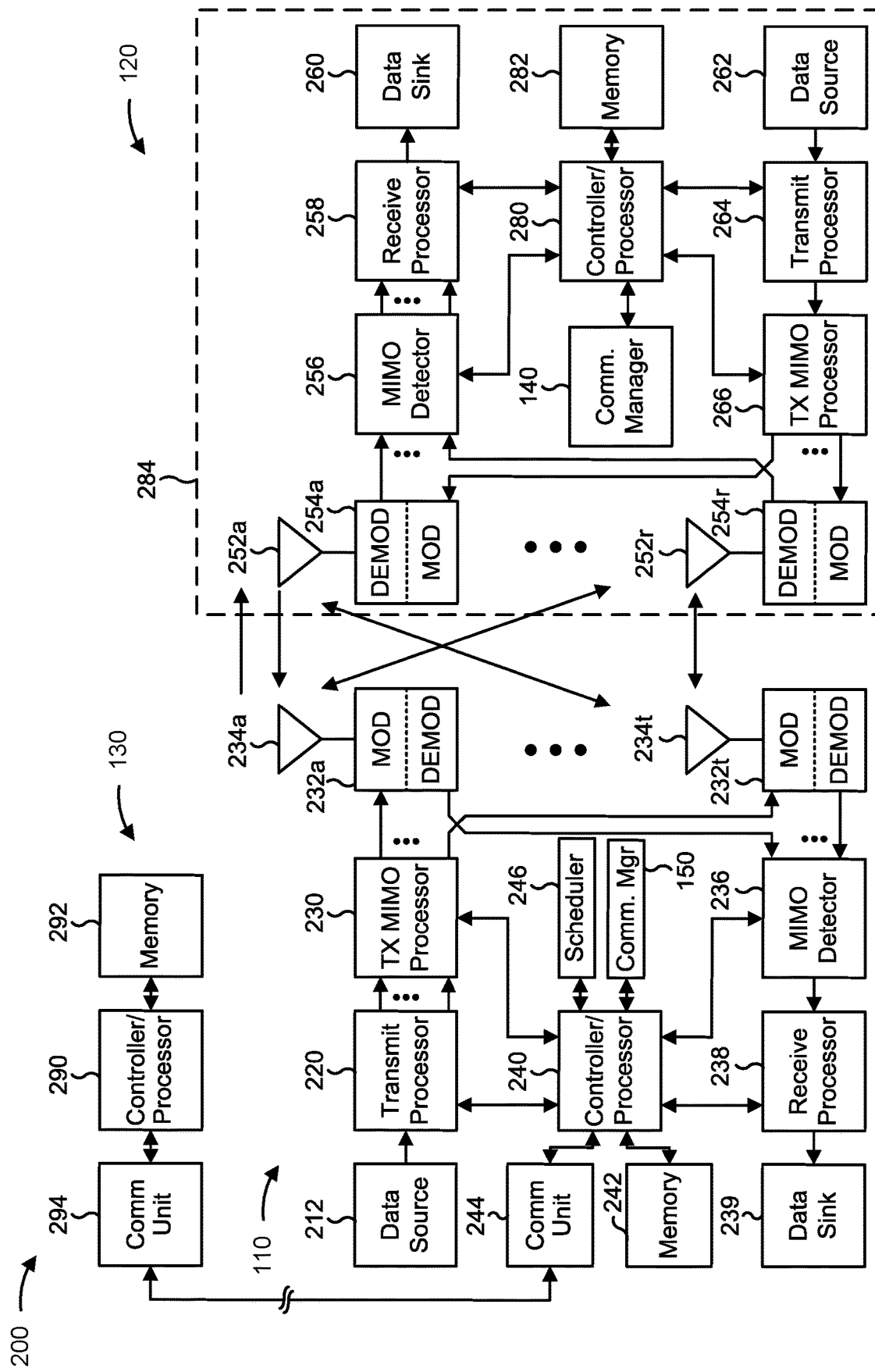
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the base station 110, the controller/processor 280 of the UE 120, and/or any other component(s) of FIG. 2 may perform one or more techniques associated with power control for AN transmission for PLS, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving a configuration associated with artificial noise assisted physical layer security for at least one of an uplink channel or a sidelink channel; means for receiving an indication of a power allocation parameter associated with a power allocation between a data signal and an artificial noise signal; and/or means for transmitting, via the uplink channel or the sidelink channel, at least one of the data signal or the artificial noise signal with the power allocation between the data signal and the artificial noise signal based at least in part on the power allocation parameter. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, a configuration associated with artificial noise assisted physical layer security for at least one of an uplink channel or a sidelink channel; and/or means for transmitting, to the UE, an indication of a power allocation parameter associated with a power allocation between transmitting a data signal on the uplink channel or the sidelink channel and transmitting an artificial noise signal to provide the artificial noise assisted physical layer security for the data signal. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
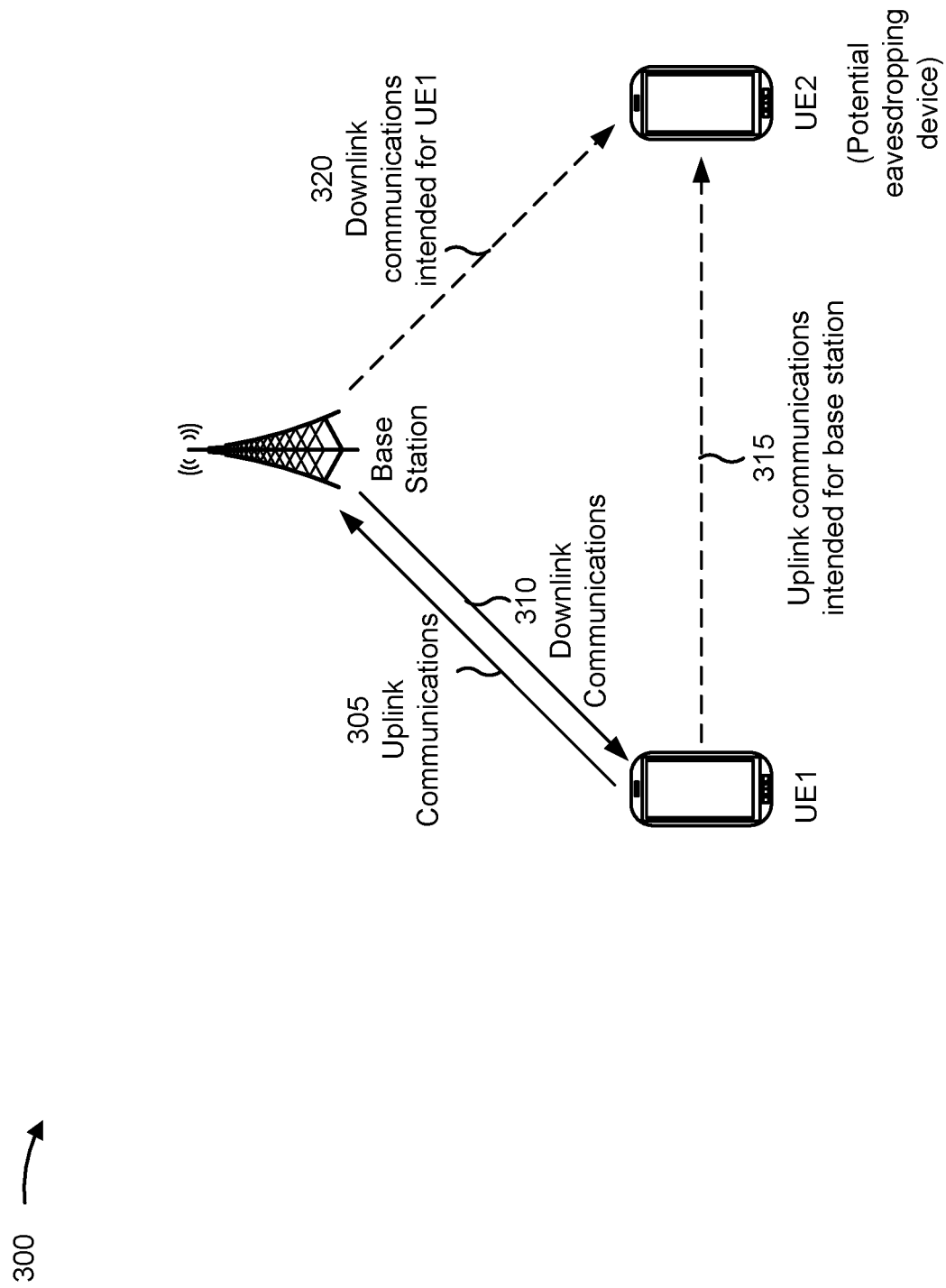
FIG. 3 is a diagram illustrating an example of a wireless network with a potential eavesdropping device, in accordance with the present disclosure.

FIG. 3 is a diagram illustrating an example 300 of a wireless network with a potential eavesdropping device, in accordance with the present disclosure.

Secure communications may be important in wireless communications systems. For example, security may be especially beneficial in wireless communication systems, such as IoT systems, in which a large number of devices communicate with each other. In some cases, such as when a UE is in a radio resource control (RRC) connected mode, layer 3 (L3) security may be applied for some communications (e.g., RRC messages) between a base station and a UE. However, some channels, such as layer 1 (L1) (e.g., the physical layer or PHY layer) channels may not have L3 security. For example, such physical layer channels may include a physical downlink control channel (PDCCH), a physical downlink shared channel (PDSCH), a physical uplink control channel (PUCCH), a physical uplink shared channel (PUSCH), a physical sidelink control channel (PSCCH), a physical sidelink shared channel (PSSCH), and/or a physical sidelink feedback channel (PSFCH). In some examples, such physical layer channels may be susceptible to eavesdropping.

As shown in FIG. 3, example 300 includes a base station, a first UE (UE1), and second UE (UE2). As shown by reference number 305, UE1 may transmit uplink communications to the base station. For example, UE1 may transmit PUCCH communications and/or PUSCH communications to the base station. As shown by reference number 310, the base station may transmit downlink communications to UE1. For example, the base station may transmit PDCCH communications and/or PDSCH communications to UE1. UE2 may be a potential eavesdropping device. For example, UE2 may attempt to eavesdrop on communications between UE1 and the base station. As shown by reference number 315, UE2 may attempt to eavesdrop on the uplink communications that are transmitted by UE1 and intended for the base station. In this case, UE2 may receive the uplink communications intended for the base station and attempt to decode the uplink communications. As shown by reference number 320, UE2 may attempt to eavesdrop on the downlink communications that are intended for UE1. In this case, UE2 may receive the downlink communications intended for UE1 and attempt to decode the downlink communications intended for UE1.

In some examples, a potential eavesdropping device, such as UE2, may use a fake base station attack, in which the potential eavesdropping device attempts to appear as the base station to another UE (e.g., UE1) to receive the uplink communications transmitted by that UE. Such eavesdropping can result in leakage of sensitive information, such as personal information, financial information, confidential information, and/or medical information, among other examples, as well as loss of network service and/or reduced network throughput.

As indicated above, FIG. 3 is provided as an example. Other examples may differ from what is described with respect to FIG. 3.

In some cases, a secrecy key may be shared between legitimate terminals and used to provide PLS (e.g., security for physical layer channels). For example, such legitimate terminals may include a transmitting device (e.g., a UE or a base station) and an intended (or legitimate) receiving device (e.g., a base station or a UE). In some examples, the transmitting device and the legitimate receiving device may generate the secrecy key using upper layer (e.g. L3) techniques, such as a Diffie-Hellman technique, to obtain a symmetric secrecy. In some examples, other techniques, such as RSA or elliptic curve cryptography (ECC), among other examples, may be used to generate the secrecy key.

In some examples, PLS may be provided by the transmitting device rotating or remapping quadrature amplitude modulation (QAM) constellation points of a data signal based on the secrecy key prior to transmitting the data signal to the receiving device. For example, the transmitting device may use the same key or rotation for M resource elements (REs), or the transmitting device may use a different key or rotation for every RE. The legitimate receiving device, which knows the secrecy key, may remove or cancel the rotation or remapping based on the secrecy key in order to decode the data signal transmitted by the transmitting device.

In some examples, PLS may be provided by the transmitting device generating AN based on the secrecy key and adding the AN to the data signal transmitted by the transmitting device. For example, the transmitting device may generate the AN by generating signals (e.g., QAM, Gaussian, or uniform, among other examples) using a pseudo-random generator with the secrecy key as the seed. The AN may be added to each RE or as common noise across M REs.

The legitimate receiving device, which knows the secrecy key, may reconstruct the AN based on the secrecy key. The legitimate receiving device may then cancel or remove the AN from the received signal before transmitting the signal. This AN may provide PLS because a potential eavesdropping device, which does not know the secrecy key, may not be able to remove the AN from the transmitted signal.

In some aspects, power management of AN transmission may provide increased secrecy for AN-assisted PLS. A signal transmitted by a transmitting device may be represented as Y=X+Z, where X is the data and Z is the AN. In this case, the total transmission power may be P=Px+Pz, where Px is the transmission power of the data and Pz is the transmission power of the AN. If there is no AN (e.g., Z=0), then Px=P, and an achievable bit error rate (BER) at any receiver (assuming the same channel conditions at all receivers) may be a direct function of Px=P (e.g., the BER may decrease for all receivers based on an increase in transmission power of the data signal). In a case in which there is AN (e.g., Z>0), a receiver that knows Z (e.g., a legitimate receiving device) may cancel Z and then decode X. In this case, assuming that an additive white Gaussian noise (AWGN) power is $N_o$, the achievable BER for the receiver that knows Z is a function of $Px/N_o$. A receiver that does not know Z may not cancel Z prior to decoding the transmitted signal (Y=X+Z). In this case, the achievable BER for the receiver that does not know Z is a function of the signal-to-interference-plus-noise ratio (SINR), where SINR=Px/(Pz+$N_o$) ($Px/N_o$) ($Pz/N_o$+1).

In a case in which Z>0 (e.g., AN is added), at a high $Px/N_o$ and a high $Pz/N_o$, the BER at the legitimate receiver may be low (e.g., close to zero), and the BER for any other receiver (e.g., a potential attacker or eavesdropping device) may be higher than the BER at the legitimate receiver. In this case, the BER for a receiver other than the legitimate receiver may be based at least in part on Px=Pz. For example, increasing Px relative to Pz may result in a decrease in the BER for the non-legitimate receiver (as well as for the legitimate receiver), and increasing Pz relative to Px may result in an increase in the BER for the non-legitimate receiver, which corresponds to increased secrecy and PLS security for the data signal. Accordingly, controlling the ratio of power allocated to the data and the AN may be used to increase the effectiveness of AN-assisted PLS and/or to balance the AN-assisted PLS with the reliability of transmitting the data to the legitimated receiving device.

Some techniques and apparatuses described herein enable UE to receive a configuration associated with AN-assisted PLS for at least one of an uplink channel or a sidelink channel. The UE may receive, from a base station, an indication of a power allocation parameter associated with a power allocation between a data signal and an AN signal. The UE may transmit, via the uplink channel or the sidelink channel, at least one of the data signal or the artificial noise signal with the power allocation between the data signal and the AN signal based at least in part on the power allocation parameter. In some aspects, a base station may indicate to one UE to transmit a data signal in an uplink channel or a sidelink channel, and the base station may indicate to one or more other UEs to transmit an AN signal to provide PLS for the uplink channel or the sidelink channel. As a result, the power allocation between transmission of the data signal and transmission of the AN (e.g., by the same UE, by different UEs, or a combination thereof) may be controlled, which may increase the secrecy and security provided by the AN and/or balance the security provided by the AN with the reliability of the data signal transmitted to a legitimate receiving device.

Figure 4:
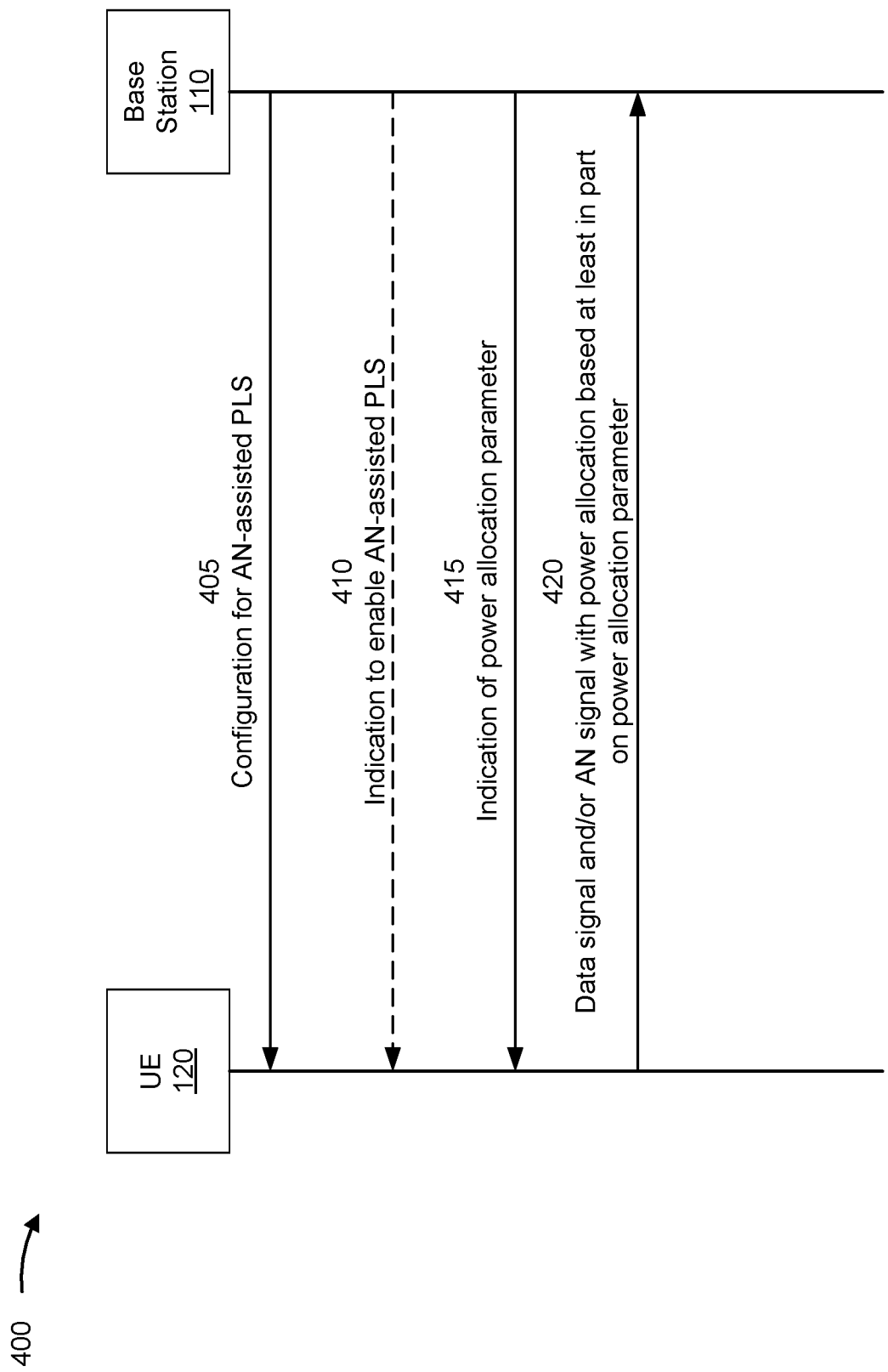
FIGS. 4-5 are diagrams illustrating examples associated with power control for artificial noise (AN) transmission for physical layer security (PLS), in accordance with the present disclosure.

FIG. 4 is a diagram illustrating an example 400 associated with power control for AN transmission for PLS, in accordance with the present disclosure. As shown in FIG. 4, example 400 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 4, and by reference number 405, the base station 110 may transmit, to the UE 120, a configuration associated with AN-assisted PLS. The UE 120 may receive the configuration transmitted by the base station 110. In some aspects, the configuration may be included an RRC message, a medium access control (MAC) control element (MAC-CE), and/or user-assisted information. In some aspects, the configuration may configure an AN-assisted PLS feature to be enabled or disabled for one or more physical channels. For example, the configuration may configure the AN-assisted PLS for one or more physical uplink channels (e.g., PUCCH and/or PUSCH) and/or for one or more physical sidelink channels (e.g., PSCCH, PSSCH, and/or PSFCH).

The configuration may identify one or more physical channels for which the UE 120 may be activated to transmit an AN signal to provide PLS for a transmitted data signal. Transmitting the AN signal to provide PLS for a data signal transmitted on a physical channel may also be referred to as "jamming" that physical channel. The configuration may configure the UE 120 to be a jamming UE (e.g., a UE that transmits the AN signal) for one or more physical channels. In this case, the UE 120 may be activated to transmit the AN signal on a configured channel when the UE 120 is transmitting data on that channel or when another UE 120 is transmitting data on that channel. In some aspects, the UE 120 may be configured to jam data channels (e.g., PUSCH and/or PSSCH), control channels (e.g., PUCCH and/or PSCCH), sidelink feedback channels (e.g., PSFCH), or a combination thereof. In some aspects, MAC-CE and RRC signaling carried on PUSCH and/or PSSCH may be included with the control channels.

In some aspects, all or part of the configuration may be included in a configuration of sidelink resource pools for the UE 120 to use for sidelink communications with other UEs (e.g., via a PC5 interface). In some aspects, the sidelink channels for which the UE 120 is configured to jam may be configured per sidelink resource pool. For example, the configuration may identify, for each of one or more sidelink resource pools configured for the UE 120, one or more sidelink channels (e.g., PSSCH, PSCCH, and/or PSFCH) for which the UE 120 is configured to transmit the AN signal to provide AN-assisted PLS.

In some aspects, the configuration may include one or more patterns of symbols to jam for an uplink channel or a sidelink channel. In some aspects, the configuration may include multiple possible patterns of symbols to jam. For example, each pattern of symbols of the multiple possible patterns of symbols may be associated with a respective index. In some aspects, the configuration may configure one or more patterns of symbols to jam for each sidelink resource pool.

In some aspects, the configuration may include one or more patterns of REs or resource blocks (RBs) to jam within a bandwidth part (BWP) for an uplink channel. In some aspects, the configuration may include multiple possible patterns of REs or RBs to jam per BWP. For example, each pattern of REs or RBs of the multiple possible patterns of REs or RBs for a BWP may be associated with a respective index. In some aspects, the configuration may include one or more patterns of REs or RBs to jam within a sidelink resource for a sidelink channel. In some aspects, the configuration may include multiple possible patterns of REs or RBs to jam per sidelink resource pool. For example, each pattern of REs or RBs of the multiple possible patterns of REs or RBs for a sidelink resource pool may be associated with a respective index.

In some aspects, the configuration may indicate one or more power parameters associated with transmitting the AN signal. For example, the configuration may indicate a maximum power value for the AN signal (e.g., P(MAX_AN), a parameter associated with a power to overcome pathloss for the AN signal (e.g., Po_PUSCH_AN), and/or other power parameters for the AN signal.

As further shown in FIG. 4, and by reference number 410, the base station 110 may transmit, to the UE 120, an indication to enable AN-assisted PLS. The UE 120 may receive the indication to enable AN-assisted PLS. The indication may enable or activate AN-assisted PLS (e.g., jamming) for at least one of an uplink channel or a sidelink channel. In some aspects, the indication may activate AN-assisted PLS for multiple channels, such as all channels for which the UE 120 is configured to transmit the AN signal. In some aspects, the indication may indicate a particular channel or channels for which AN-assisted PLS is activated. In some aspects, the indication to activate AN-assisted PLS may be included in downlink control information (DCI), a MAC-CE, or an RRC message.

In some aspects, the indication to activate/enable AN-assisted PLS may be the same in a case in which the UE 120 is being activated to transmit the AN signal to provide AN-assisted PLS for a data signal also being transmitted by the UE 120, as in a case in which the UE 120 is transmitting the AN signal to provide AN-assisted PLS for a data signal transmitted by another UE. In some aspects, different indications may be used to activate the UE 120 to transmit the AN signal together with the data signal and to activate the UE 120 to transmit the AN signal to provide AN-assisted PLS for a data signal transmitted by another UE.

In some aspects, the UE 120 may receive the indication from another UE, instead of or in addition to receiving the indication from the base station 110 (as shown in FIG. 4). In this case, the indication may be included in sidelink control information (SCI) received from the other UE. In some aspects, the UE 120 may transmit the indication to another UE (e.g., via SCI) to activate the other UE to transmit the AN to provide AN-assisted PLS.

As further shown in FIG. 4, and by reference number 415, the base station 110 may transmit, to the UE 120, an indication of a power allocation parameter. The power allocation parameter may be associated with a power allocation between a data signal and an artificial noise signal. The UE 120 may receive the indication of the power allocation parameter, and the UE 120 may determine the power allocation between the data signal and the artificial noise signal based at least in part on the power allocation parameter. In some aspects, the base station 110 may use dynamic signaling (e.g., DCI and/or MAC-CE) to transmit the indication of the power allocation parameter to the UE 120. In some aspects, the indication of the power allocation parameter may be included in the configuration.

In some aspects, the power allocation parameter $\beta_{sec}$ may indicate a portion of a total transmission power for a channel (e.g., an uplink channel or a sidelink channel) to be allocated for transmitting the data signal. For example, the power allocation parameter $\beta_{sec}$ may have a value within a range $0 \leq \beta_{sec} \leq 1$. In this case, an amount of power to be allocated for transmitting the AN signal may be based at least in part on a remaining portion $(1-\beta_{sec})$ of the total transmission power, other than the portion $(\beta_{sec})$ of total transmission power allocated for transmitting the data signal. In some aspects, the power allocated for transmitting the AN signal may be equal to the remaining portion $(1-\beta_{sec})$ of the total transmission power. In some aspects, the power allocated for transmitting the AN signal may be determined based at least in part on the remaining portion $(1-\beta_{sec})$ of the total transmission power subject to one or more power parameters associated with the AN signal, such as a maximum power value for the AN signal (e.g., PCMAX_AN), a parameter associated with a power to overcome pathloss for the AN signal (e.g., Po_PUSCH_AN), and/or other power parameters configured for the AN signal. For example, the power allocated for transmitting the AN signal may be a smaller value among the remaining portion $(1-\beta_{sec})$ of the total transmission power and the maximum power value configured for the AN signal (e.g., PCMAX_AN).

In a case in which the UE 120 transmits both the data signal and the AN signal, the power allocation parameter $\beta_{sec}$ may control a power splitting factor between the power allocated for transmitting the data signal and the power allocated for transmitting the AN signal. For example, in a case in which the UE 120 transmits the data signal and the AN signal on an uplink channel (e.g., PUSCH), the UE 120 may determine a total transmit power for the uplink channel (e.g., $P_{PUSCH}$). In this case, the UE 120 may scale the total transmit power for the uplink channel by the power allocation parameter $\beta_{sec}$ to determine the power allocation for transmitting the data signal (e.g., $P_{data}=P_{PUSCH}*(sec)$). The UE 120 may scale the total transmit power for the uplink channel by $(1-\beta_{sec})$ and determine the power allocation for the AN signal based at least in part on the resulting value $(P_{PUSCH}*(1-\beta_{sec}))$. Additionally, or alternatively, the UE 120 may determine the power allocation between the data signal and the AN signal in a case in which the data signal and the AN signal are transmitted on a sidelink channel (e.g., PSSCH) by scaling a total transmission power for the sidelink channel (e.g., $P_{PSSCH}$) using the power allocation parameter $\beta_{sec}$.

In some aspects, the power allocation parameter $\beta_{sec}$ may provide an indication for the UE 120 to transmit the data signal without transmitting the AN signal. For example, an indication of $\beta_{sec}=1$ may indicate for the UE 120 to allocate 100% of the total transmission power for the channel for transmitting the data signal and to allocate 0% of the total transmission power for the channel for transmitting the AN signal. In this case, the base station 110 may transmit an indication to another UE for the other UE to transmit the AN signal to jam the channel in which the UE 120 is transmitting the data signal.

In some aspects, the power allocation parameter $\beta_{sec}$ may provide an indication for the UE 120 to transmit the AN signal without transmitting the data signal. For example, an indication of $\beta_{sec}=0$ may indicate for the UE 120 to allocate 0% of the total transmission power for the channel for transmitting the data signal and to allocate 100% of the total transmission power for the channel for transmitting the AN signal. In this case, power allocation parameter $\beta_{sec}$ may provide an indication to transmit the AN signal to jam a channel (e.g., an uplink channel or a sidelink channel) in which another UE is transmitting a data signal.

As further shown in FIG. 4, and by reference number 420, the UE 120 may transmit, via an uplink channel (e.g., PUCCH or PUSCH) or a sidelink channel (e.g., PSCCH, PSSCH, or PSFCH), the data signal and/or the AN signal with the power allocation between the data signal and the AN signal based at least in part on the power allocation parameter.

In some aspects, the UE 120 may transmit both the data signal and the AN signal with the total transmission power for the channel (e.g., the uplink channel or the sidelink channel) split between the data signal and the AN signal based at least in part on the power allocation parameter. In some aspects, based at least in part on the power allocation parameter (e.g., $\beta_{sec}$=0), the UE 120 may transmit the AN signal in the channel (e.g., the uplink channel or the sidelink channel) without transmitting the data signal. In this case, the UE 120 may transmit the AN signal to jam the channel to provide AN-assisted PLS for a data signal being transmitted in the channel by another UE. In some aspects, based at least in part on the power allocation parameter (e.g., $\beta_{sec}$=1), the UE 120 may transmit the data signal in the channel (e.g., the uplink channel or the sidelink channel) without transmitting the AN signal. In this case, another UE may transmit the AN signal to jam the channel in which the UE 120 is transmitting the data signal.

In cases in which the UE 120 transmits the AN signal (e.g., together with the data signal or without the data signal), the UE 120 may generate the AN signal based on a secrecy key shared between the UE 120 and an intended receiving device for the data signal. For example, the intended receiving device may be the base station 110 in a case in which the data signal is transmitted in an uplink channel (e.g., as shown in FIG. 4), or the intended receiving device may be another UE in a case in which the data signal is transmitted in a sidelink channel. In some aspects, the UE 120 and the intended receiving device may obtain a symmetric secrecy key. For example, the UE 120 and the intended receiving device may obtain a symmetric secrecy key using an L3 key generation technique, such as Diffie-Hellman technique. In some aspects, the UE 120 may generate the AN signal using a pseudo-random generator with the secrecy key as the seed.

In some aspects, in a case in which the UE 120 transmits the data signal and the AN signal, the UE 120 may add the AN signal in a waveform domain over a set of resources (e.g., M REs) in which the data signal is transmitted. In some aspects, in a case in which the UE 120 transmits the data signal and the AN signal, the UE 120 may add the AN signal in a baseband to provide PLS for all or a subset of resources in which the data signal is transmitted. For example, the UE 120 may add the AN signal, on a per symbol basis, to REs in all or a subset of symbols in which the data signal is transmitted.

In some aspects, in cases in which the UE 120 transmits the AN signal (e.g., together with the data signal or without the data signal), the UE 120 may transmit the AN signal over symbols associated with the data signal based at least in part on a pattern of symbols. For example, for a data signal being transmitted in an uplink channel, the pattern of symbols may be a pattern of symbols to jam within the BWP associated with the UE transmitting the data signal (e.g., the UE 120 or another UE). For a data signal being transmitted in a sidelink channel, the pattern of symbols may be a pattern of symbols to jam in a sidelink resource pool used to transmit the data signal. In some aspects, the UE 120 may receive an indication of the pattern of symbols to jam. For example, the indication may include a bitmap with a size equal to a number of symbols in a slot that indicates which symbols in a slot to jam.

In some aspects, the UE 120 may receive the indication of the pattern of symbols together with the indication to enable AN-assisted PLS, an indication of which channel to jam, and/or the indication of the power allocation parameter. In some aspects, the base station 110 may transmit the indication of the pattern of symbols to the UE 120 (e.g., via DCI, MAC-CE, or an RRC message). In some aspects, the UE 120 may receive the indication of the pattern of symbols from another UE (e.g., via SCI), such as a UE that is the intended receiving device for the data signal. In some aspects, the indication of the pattern of symbols may be included in the configuration. In some aspects, the pattern of symbols may be selected from one or more patterns of symbols included in the configuration. In some aspects, to configure the UE 120 to transmit the AN signal in a first pattern of symbols z (e.g., in a binary format), the base station 110 (or another UE) may transmit, to the UE 120, an indication of a second pattern z', where XOR (z', a secrecy key (in binary))=z. In this case, the secrecy key may only be known at legitimate devices, and the UE 120 may determine the pattern of symbols to jam z from the indicated pattern of symbols z' based at least in part on the secrecy key. For example, the secrecy key may be the same secrecy key as the secrecy key used to generate the AN signal or a different secrecy key from the secrecy key used to generate the AN signal.

In some aspects, the pattern of symbols may be selected from one or more patterns of symbols included in the configuration. For example, a sidelink resource pool configuration may include one or more patterns of symbols configured for the sidelink resource pool. In this case, for a data signal being transmitted in a sidelink channel, the UE 120 may select the pattern of symbols from the one or more patterns of symbols configured for the sidelink resource pool, and the UE 120 may transmit an indication of the selected pattern of symbols to jam to the intended receiving UE. For example, the UE 120 may transmit the indication of the selected pattern (e.g., an index associated with the selected pattern) in SCI, such as second stage SCI (SCI-2). In some aspects, the intended receiving UE may transmit, to the UE 120, an indication of recommended pattern of symbols, and the UE 120 may select the recommended pattern of symbols or a different pattern of symbols.

In some aspects, in cases in which the UE 120 transmits the AN signal (e.g., together with the data signal or without the data signal), the UE 120 may transmit the AN signal in REs or RBs within a BWP or a sidelink resource pool associated based at least in part on a pattern of REs or RBs. For example, for a data signal being transmitted in an uplink channel, the pattern of REs or RBs may be a pattern of REs or RBs to jam within the BWP associated with the UE transmitting the data signal (e.g., the UE 120 or another UE). For a data signal being transmitted in a sidelink channel, the pattern of REs or RBs may be a pattern of REs or RBs to jam in a sidelink resource pool used to transmit the data signal. In some aspects, the UE 120 may receive an indication of the pattern of REs or RBs to jam. For example, the indication may include a bitmap that indicates which REs or RBs in the BWP or the sidelink resource pool to jam.

In some aspects, the UE 120 may receive the indication of the pattern of RES or RBs together with the indication to enable AN-assisted PLS, an indication of which channel to jam, and/or the indication of the power allocation parameter.

In some aspects, the base station 110 may transmit the indication of the pattern of REs or RBs to the UE 120 (e.g., via DCI, MAC-CE, or an RRC message). In some aspects, the UE 120 may receive the indication of the pattern of REs or RBs from another UE (e.g., via SCI), such as a UE that is the intended receiving device for the data signal. In some aspects, the indication of the pattern of REs or RBs may be included in the configuration. In some aspects, to configure the UE 120 to transmit the AN signal in a first pattern of REs or RBs z (e.g., in a binary format), the base station 110 (or another UE) may transmit, to the UE 120, an indication of a second pattern z', where XOR (z', a secrecy key (in binary))=z. In this case, the secrecy key may only be known at legitimate devices, and the UE 120 may determine the pattern of REs or RBs to jam z from the indicated pattern of REs or RBs z' based at least in part on the secrecy key. For example, the secrecy key may be the same secrecy key as the secrecy key used to generate the AN signal or a different secrecy key from the secrecy key used to generate the AN signal.

In some aspects, the pattern of REs or RBs may be selected from one or more patterns of REs or RBs included in the configuration. For example, a sidelink resource pool configuration may include one or more patterns of REs or RBs configured for the sidelink resource pool. In this case, for a data signal being transmitted in a sidelink channel, the UE 120 may select the pattern of REs or RBs from the one or more patterns of REs or RBs configured for the sidelink resource pool, and the UE 120 may transmit an indication of the selected pattern of REs or RBs to jam to the intended receiving UE. For example, the UE 120 may transmit the indication of the selected pattern (e.g., an index associated with the selected pattern) in SCI, such as SCI-2. In some aspects, the intended receiving UE may transmit, to the UE 120, an indication of recommended pattern of REs or RBs, and the UE 120 may select the recommended pattern of REs or RBs or a different pattern of REs or RBs.

The intended receiving device (e.g., the base station 110 or another UE) may receive the data signal and the AN signal. The intended receiving device may generate the AN signal based at least in part on the secrecy key shared between the UE 120 and the intended receiving device, and the intended receiving device may cancel or remove the AN signal from the data signal. The intended receiving device may then decode the data signal. In some aspects, such as in a case in which the data signal is transmitted via an uplink channel, the base station 110 may be the intended receiving device. In some aspects, such as in a case in which the data signal is transmitted via a sidelink channel, another UE may be the intended receiving device.

As described above, the UE 120 may receive a configuration associated with AN-assisted PLS for at least one of an uplink channel or a sidelink channel. The UE 120 may receive, from the base station 110, an indication of a power allocation parameter associated with a power allocation between a data signal and an AN signal. The UE 120 may transmit, via the uplink channel or the sidelink channel, at least one of the data signal or the artificial noise signal with the power allocation between the data signal and the AN signal based at least in part on the power allocation parameter. In some aspects, the base station 110 may indicate that the UE 120 is to transmit the data signal and the AN signal. In some aspects, the base station 110 may indicate that the UE 120 is to transmit the data signal, and another UE is to transmit the AN signal to provide AN-assisted PLS for the data signal. In some aspects, the base station 110 may indicate that the UE 120 is to transmit the AN signal to provide AN-assisted PLS for a data signal transmitted by another UE. As a result, the power allocation between transmission of the data signal and transmission of the AN (e.g., by the same UE, by different UEs, or a combination thereof) may be controlled, which may increase the secrecy and security provided by the AN and/or balance the security provided by the AN with the reliability of the data signal transmitted to a legitimate receiving device.

As indicated above, FIG. 4 is provided as an example. Other examples may differ from what is described with respect to FIG. 4.

Figure 5:
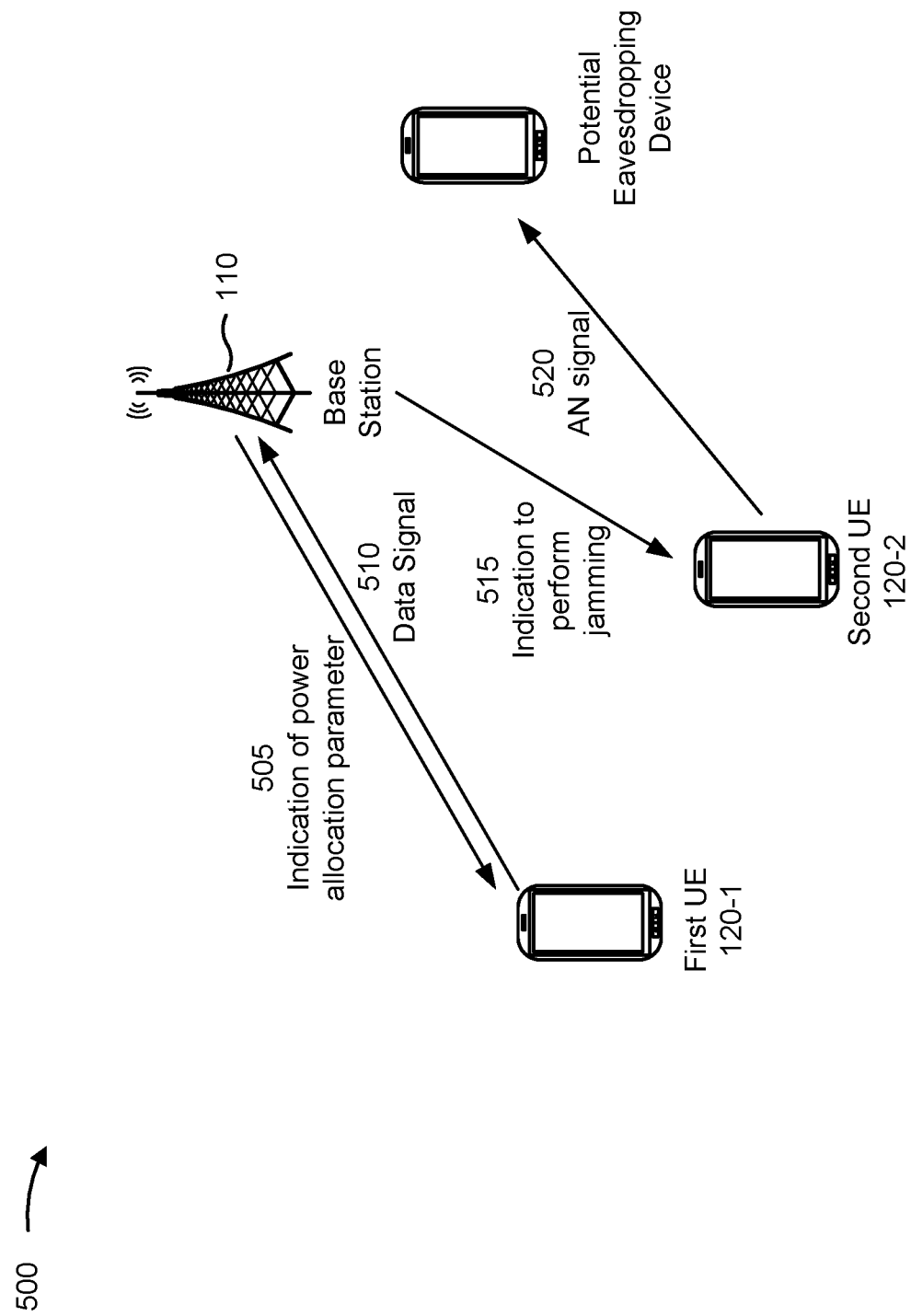

FIG. 5 is a diagram illustrating an example 500 associated with power control for AN transmission for PLS, in accordance with the present disclosure. As shown in FIG. 5, example 500 includes communication between a base station 110, a first UE 120-1, and a second UE 120-2. In some aspects, the base station 110, the first UE 120-1, and the second UE 120-2 may be included in a wireless network, such as wireless network 100. The base station 110, the first UE 120-1, and the second UE 120-2 may communicate via a wireless access link, which may include an uplink and a downlink.

As shown in FIG. 5, and by reference number 505, the base station 110 may transmit, to the first UE 120-1, an indication of a power allocation parameter. For example, the power allocation parameter ($\beta_{sec}$) may be associated with a power allocation between transmission of a data signal and transmission of an AN signal by the first UE 120-1. As shown by reference number 510, the first UE 120-1, based at least in part on the power allocation parameter, may transmit the data signal in an uplink channel (e.g., PUCCH and/or PUSCH) to the base station 110. In this case, the power allocation parameter may indicate to the first UE 120-1 to only transmit the data signal in the uplink channel (e.g., $\beta_{sec}=1$), or the power allocation parameter may indicate to the first UE 120-1 to transmit the data signal and an AN signal in the uplink channel with the uplink transmission power split between the data signal and the AN signal based at least in part on the power allocation parameter. In some aspects, the first UE 120-1 may transmit the data signal (and possibly the AN signal) via a sidelink channel to another UE, instead of transmitting the data signal to the base station 110 in the uplink channel, as shown in FIG. 5.

As further shown in FIG. 5, and by reference number 515, the base station 110 may transmit, to the second UE 120-2, an indication to perform jamming to provide AN-assisted PLS for the data signal transmitted by the first UE 120-1. In this case, the first UE 120-1 may be considered the data UE that transmits the data signal, and the base station 110 may assign the second UE 120-2 to be a helping UE (or jamming UE) that helps jam the channel (e.g., the uplink channel) used by the data UE to transmit the data signal to help protect the data signal from a potential eavesdropping device. In some aspects, the base station 110 may select one or more helping UEs (e.g., the second UE 120-2) to transmit AN signals to help jam a channel in which a data UE (e.g., the first UE 120-1) is transmitting a data signal. In some aspects, the data UE (e.g., the first UE 120-1) may also transmit an AN signal in addition to the data signal and in addition to the AN signal(s) transmitted by the one or more helping UEs (e.g., the second UE 120-2). The base station 110 may select the one or more helping UEs to boost the PLS provide for the data signal transmission. For example, by selecting the helping UEs, the base station 110 may increase the total power of the AN signals being transmitted to jam the channel, resulting in increased protection against eavesdropping devices for the data signal transmitted on the channel.

In some aspects, the second UE 120-2 (e.g., the helping UE) may receive one or more incentives for transmitting the AN signal. For example, the second UE 120-2 may receive, from the base station 110, extra resources allocated for downlink, uplink, and/or sidelink communications, which may increase reliability and throughput for wireless communications for the second UE 120-2. Additionally, or alternatively, in some aspects, the second UE 120-2 may collect energy using RF energy harvesting from energy signals received from the base station 110 (or other devices) as an incentive for transmitting the AN signal.

In some aspects, the indication to perform jamming may be include indication to activate or enable an AN-assisted PLS mode configured for the second UE 120-2. In some aspects, the indication may be received from another UE, instead of the base station 110, as shown in FIG. 5. In some aspects, the indication may be signaled through a PC5/Uu RRC message or a MAC-CE. In some aspects, the indication may include an explicit indication (e.g., in DCI or SCI) associated with helping to perform jamming without transmitting data. In some aspects, the base station 110 (or another UE) may indicate that the second UE 120-2 is to perform jamming for a data signal transmitted by another UE using the power allocation parameter. For example, the base station 110 may transmit, to the second UE 120-2, an indication of a power allocation parameter with a value (e.g., $\beta_{sec}=0$) that indicates that the second UE 120-2 is to transmit the AN signal without transmitting a data signal.

In some aspects, the base station 110 may indicate, to the second UE 120-2 (and any other jamming UEs), which channel to jam and which resources to jam. For example, the base station 110 may indicate a pattern of symbols to jam within a slot and/or a pattern of REs or RBs to jam within a BWP (or a sidelink resource pool for a sidelink channel). In this case, the base station 110 may transmit, to the second UE 120-2, bitmaps representing the patterns of symbols and/or REs or RBs to be jammed. In some aspects, the indication of which channel to jam and/or which resource to jam may be transmitted with the indication to perform jamming or may be transmitted separately from the indication to perform jamming.

As further shown in FIG. 5, and by reference number 520, the second UE 120-2 may transmit an AN signal based at least in part on the indication to perform jamming. The second UE 120-2 may generate the AN signal based at least in part on a secrecy key shared between the second UE 120-2 and the intended receiving device (e.g., the base station 110 in FIG. 5), as described above. The second UE 120-2 (e.g., the helping UE) may transmit the AN signal using the same uplink BWP as the uplink BWP part used by the first UE 120-1 (e.g., the data UE) to transmit the data signal. In some aspects, in a case in which a helping UE (e.g., the second UE 120-2) is transmitting the AN signal to jam a sidelink channel, the helping UE may transmit the AN signal using a same sidelink resource pool as the sidelink resource pool used by the data UE to transmit the data signal.

In some aspects, the second UE 120-2 (e.g., the helping UE) may be a device that is capable of sending and receiving data on the same resources (e.g., unless the helping UE is a full-duplex (FD) device). In some aspects, the second UE 120-2 (e.g., the helping UE) may transmit the AN signal based at least in part on a determination that the second UE 120-2 has a high enough power level (or battery level) to transmit the AN signal at the power allocated for the AN signal.

In some aspects, the base station 110 (or an intended receiving UE in the case of sidelink communication) may select the second UE 120-2 (and/or other UEs) to be a helping UE based on position information associated with the second UE 120-2 (and/or the other UEs). For example, the position information may be known at the base station 110. In some aspects, the base station 110 may select the second UE 120-2 as the helping UE based at least in part the second UE 120-2 being located at a position close to the intended receiving device (e.g., the base station 110 or an intended receiving UE), which may increase the effectiveness of the jamming signal (e.g., the AN signal). In some aspects, the base station 110 may select the second UE 120-2 as the helping UE based at least in part on the second UE 120-2 being located at a position close to the data UE (e.g., the first UE 120-1) that is transmitting the data signal.

In some aspects, the base station 110 may select the second UE 120-2 as the helping UE based at least in part on a beam forming ability of the second UE 120-2. In some aspects, in a case in which a potential eavesdropping device (or a cluster of potential eavesdropping devices) is identified, the second UE 120-2 (e.g., the helping UE) may perform beamforming to direct the AN signal toward the potential eavesdropping device (or cluster of potential eavesdropping devices). In some aspects, in a case in which the second UE 120-2 (e.g., the helping UE) is capable of performing directive beamforming, the second UE 120-2 may perform precoding for the AN signal based at least in part on an orthogonal direction to the intended (legitimate) receiving device (e.g., the base station 110 in FIG. 5). In this case, the orthogonal direction to the intended (legitimate) receiving device may be determined based at least in part on a precoding matrix indicator (PMI) (e.g., a PMI between the second UE 120-2 and the intended receiving device) or a direction indication associated with a direction to the intended (legitimate) receiving device. In some aspects, the base station 110 may transmit, to the second UE 120-2 (e.g., the helping UE), an indication of an angle of departure (AoD), and the second UE 120-2 may transmit the AN signal in a beam direction based at least in part on the indication of the AoD. For example, the AoD may be an AoD associated with the potential eavesdropping device (or cluster of potential eavesdropping devices). The indication of the AoD may include an indication of an azimuth and an indication of a zenith of departure.

As shown in FIG. 5, the base station 110 may receive the data signal transmitted by the first UE 120-1. The base station 110, which knows the secrecy key used by the second UE 120-2 to generate the AN signal, may cancel the AN signal using the secrecy key. The base station 110 may then decode the data signal.

As indicated above, FIG. 5 is provided as an example. Other examples may differ from what is described with respect to FIG. 5.

Figure 6:
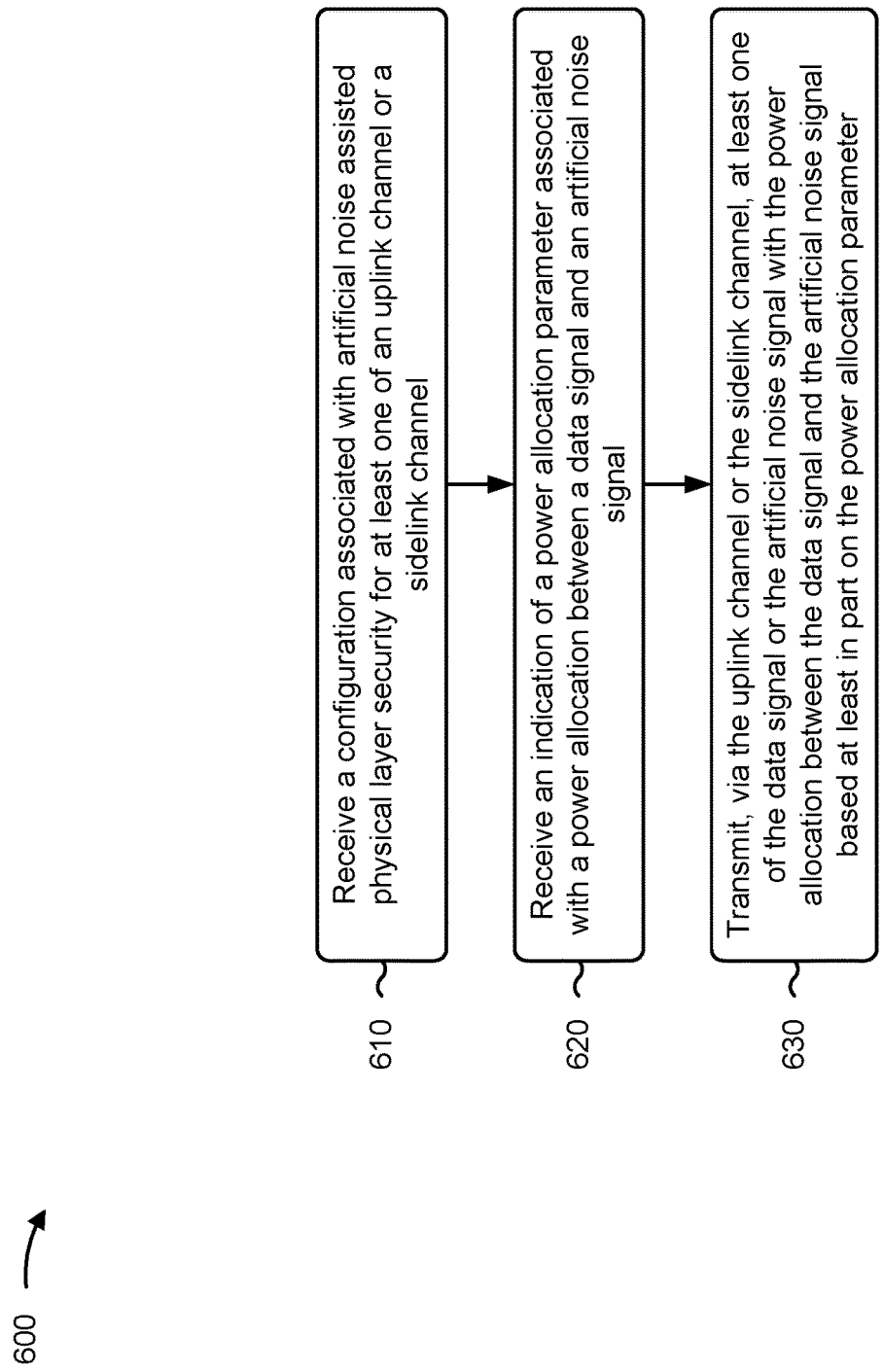
FIGS. 6-7 are diagrams illustrating example processes associated with power control for AN transmission for PLS, in accordance with the present disclosure.

FIG. 6 is a diagram illustrating an example process 600 performed, for example, by a UE, in accordance with the present disclosure. Example process 600 is an example where the UE (e.g., UE 120) performs operations associated with power control for AN transmission for PLS.

As shown in FIG. 6, in some aspects, process 600 may include receiving a configuration associated with artificial noise assisted physical layer security for at least one of an uplink channel or a sidelink channel (block 610). For example, the UE (e.g., using communication manager 140 and/or reception component 802, depicted in FIG. 8) may receive a configuration associated with artificial noise assisted physical layer security for at least one of an uplink channel or a sidelink channel, as described above.

As further shown in FIG. 6, in some aspects, process 600 may include receiving an indication of a power allocation parameter associated with a power allocation between a data signal and an artificial noise signal (block 620). For example, the UE (e.g., using communication manager 140 and/or reception component 802, depicted in FIG. 8) may receive an indication of a power allocation parameter associated with a power allocation between a data signal and an artificial noise signal, as described above.

As further shown in FIG. 6, in some aspects, process 600 may include transmitting, via the uplink channel or the sidelink channel, at least one of the data signal or the artificial noise signal with the power allocation between the data signal and the artificial noise signal based at least in part on the power allocation parameter (block 630). For example, the UE (e.g., using communication manager 140 and/or transmission component 804, depicted in FIG. 8) may transmit, via the uplink channel or the sidelink channel, at least one of the data signal or the artificial noise signal with the power allocation between the data signal and the artificial noise signal based at least in part on the power allocation parameter, as described above.

Process 600 may include additional aspects, such as any single aspect or any combination of aspects described below and/or in connection with one or more other processes described elsewhere herein.

In a first aspect, receiving the configuration includes receiving the configuration in at least one of an RRC message or a MAC-CE.

In a second aspect, alone or in combination with the first aspect, process 600 includes receiving an indication that enables the artificial noise assisted physical layer security for the at least one of the uplink channel or the sidelink channel.

In a third aspect, alone or in combination with one or more of the first and second aspects, receiving the indication of the power allocation parameter includes receiving the indication of the power allocation parameter in at least one of the configuration or dynamic signaling received from a base station.

In a fourth aspect, alone or in combination with one or more of the first through third aspects, transmitting the at least one of the data signal or the artificial noise signal includes transmitting the data signal and the artificial noise signal with the power allocation between the data signal and the artificial noise signal based at least in part on the power allocation parameter.

In a fifth aspect, alone or in combination with one or more of the first through fourth aspects, the power allocation parameter indicates a portion of a total transmission power, for the uplink channel or the sidelink channel, to be allocated for transmitting the data signal, and an amount of power to be allocated for transmitting the artificial noise signal is based at least in part on a remaining portion of the total transmission power other than the portion of the total transmission power to be allocated for transmitting the data signal.

In a sixth aspect, alone or in combination with one or more of the first through fifth aspects, the amount of power to be allocated for transmitting the artificial noise signal is a smaller one of the remaining portion of the total transmission power other than the portion of the total transmission power to be allocated for transmitting the data signal or a maximum power value configured for the artificial noise signal.

In a seventh aspect, alone or in combination with one or more of the first through sixth aspects, transmitting the data signal and the artificial noise signal includes generating the artificial noise signal based at least in part on a secrecy key shared between the UE and an intended receiving device, and adding the artificial noise signal in a waveform domain over a set of resources in which the data signal is transmitted.

In an eighth aspect, alone or in combination with one or more of the first through seventh aspects, transmitting the data signal and the artificial noise signal includes generating the artificial noise signal based at least in part on a secrecy key shared between the UE and an intended receiving device, and adding the artificial noise signal to resource elements in all or a subset of symbols in which the data signal is transmitted.

In a ninth aspect, alone or in combination with one or more of the first through eighth aspects, transmitting the at least one of the data signal or the artificial noise signal includes transmitting at least the artificial noise signal.

In a tenth aspect, alone or in combination with one or more of the first through ninth aspects, the configuration indicates that the UE is to transmit the artificial noise signal to provide the artificial noise assisted physical layer security for at least one of uplink or sidelink data channels, uplink or sidelink control channels, or sidelink feedback channels.

In an eleventh aspect, alone or in combination with one or more of the first through tenth aspects, the configuration identifies, for each of one or more sidelink resource pools configured for the UE, one or more sidelink channels for which the UE is to transmit the artificial noise signal to provide the artificial noise assisted physical layer security.

In a twelfth aspect, alone or in combination with one or more of the first through eleventh aspects, transmitting at least the artificial noise signal includes transmitting the artificial noise signal in symbols associated with the data signal based at least in part on a pattern of symbols.

In a thirteenth aspect, alone or in combination with one or more of the first through twelfth aspects, process 600 includes receiving an indication of the pattern of symbols.

In a fourteenth aspect, alone or in combination with one or more of the first through thirteenth aspects, the artificial noise signal is transmitted via a sidelink communication, and process 600 includes selecting the pattern of symbols from one or more patterns of symbols configured for a sidelink resource pool, and transmitting, to a receiving UE for which the data signal is intended, sidelink control information including an indication of the pattern of symbols.

In a fifteenth aspect, alone or in combination with one or more of the first through fourteenth aspects, transmitting at least the artificial noise signal includes transmitting the artificial noise signal in resource elements or resource blocks within a bandwidth part or sidelink resource pool based at least in part on a pattern of resource elements or resource blocks.

In a sixteenth aspect, alone or in combination with one or more of the first through fifteenth aspects, process 600 includes receiving an indication of the pattern of resource elements or resource blocks.

In a seventeenth aspect, alone or in combination with one or more of the first through sixteenth aspects, process 600 includes selecting the pattern of resource elements or resource blocks from one or more patterns of resource elements or resource blocks configured for the sidelink resource pool, and transmitting, to a receiving UE for which the data signal is intended, sidelink control information including an indication of the pattern of resource elements or resource blocks.

In an eighteenth aspect, alone or in combination with one or more of the first through seventeenth aspects, transmitting at least the artificial noise signal includes transmitting the artificial noise signal, without transmitting the data signal, to provide artificial noise assisted physical layer security for a data signal transmitted by another UE.

In a nineteenth aspect, alone or in combination with one or more of the first through eighteenth aspects, transmitting the artificial noise signal includes transmitting the artificial noise signal in a same uplink bandwidth part or sidelink resource pool as an uplink bandwidth part or sidelink resource pool in which the other UE transmits the data signal.

In a twentieth aspect, alone or in combination with one or more of the first through nineteenth aspects, transmitting the artificial noise signal includes performing precoding for the artificial noise signal based at least in part on a precoding matrix indicator or direction indication associated with a direction to a receiving device for which the data signal is intended.

In a twenty-first aspect, alone or in combination with one or more of the first through twentieth aspects, transmitting the artificial noise signal includes transmitting the artificial noise signal in a beam direction based at least in part on an indication, received from a base station, of an angle of departure associated with one or more potential eavesdropping devices.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
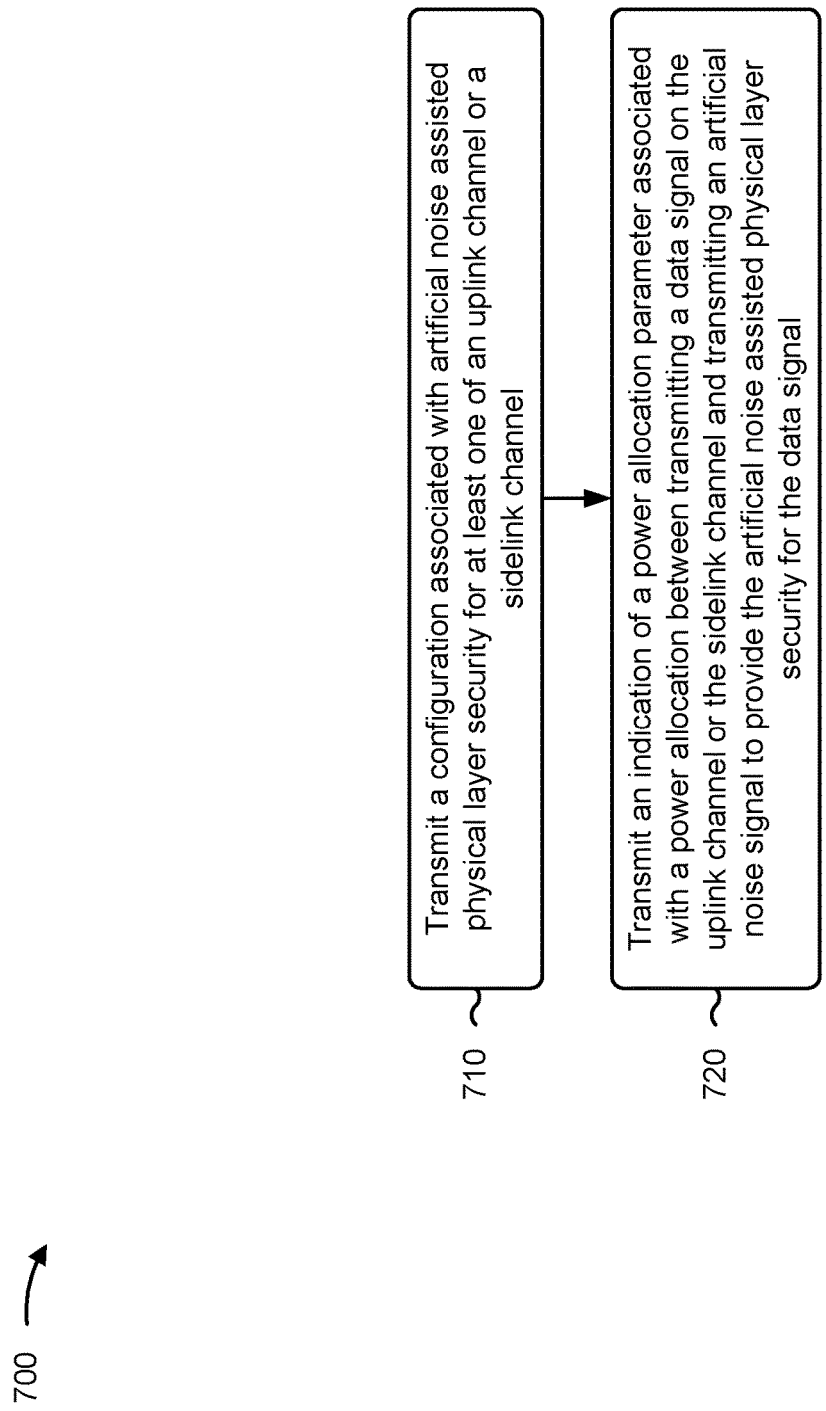

FIG. 7 is a diagram illustrating an example process 700 performed, for example, by a base station, in accordance with the present disclosure. Example process 700 is an example where the base station (e.g., base station 110) performs operations associated with power control for AN transmission for PLS.

As shown in FIG. 7, in some aspects, process 700 may include transmitting, to a UE, a configuration associated with artificial noise assisted physical layer security for at least one of an uplink channel or a sidelink channel (block 710). For example, the base station (e.g., using communication manager 150 and/or transmission component 904, depicted in FIG. 9) may transmit, to a UE, a configuration associated with artificial noise assisted physical layer security for at least one of an uplink channel or a sidelink channel, as described above.

As further shown in FIG. 7, in some aspects, process 700 may include transmitting, to the UE, an indication of a power allocation parameter associated with a power allocation between transmitting a data signal on the uplink channel or the sidelink channel and transmitting an artificial noise signal to provide the artificial noise assisted physical layer security for the data signal (block 720). For example, the base station (e.g., using communication manager 150 and/or transmission component 904, depicted in FIG. 9) may transmit, to the UE, an indication of a power allocation parameter associated with a power allocation between transmitting a data signal on the uplink channel or the sidelink channel and transmitting an artificial noise signal to provide the artificial noise assisted physical layer security for the data signal, as described above.

Process 700 may include additional aspects, such as any single aspect or any combination of aspects described below and/or in connection with one or more other processes described elsewhere herein.

In a first aspect, the power allocation parameter indicates, to the UE, to transmit the data signal, and process 700 includes transmitting, to another UE, an indication for the other UE to transmit the artificial noise signal to provide the artificial noise assisted physical layer security for the data signal to be transmitted by the UE.

In a second aspect, alone or in combination with the first aspect, transmitting the configuration includes transmitting the configuration in at least one of an RRC message or a MAC-CE.

In a third aspect, alone or in combination with one or more of the first and second aspects, process 700 includes transmitting, to the UE, an indication that enables the artificial noise assisted physical layer security for the at least one of the uplink channel or the sidelink channel.

In a fourth aspect, alone or in combination with one or more of the first through third aspects, transmitting the indication of the power allocation parameter includes transmitting the indication of the power allocation parameter to the UE in at least one of the configuration or dynamic signaling.

In a fifth aspect, alone or in combination with one or more of the first through fourth aspects, process 700 includes receiving the data signal and the artificial noise signal, and the data signal and the artificial noise signal are transmitted by the UE in the uplink channel with the power allocation between the data signal and the artificial noise signal based at least in part on the power allocation parameter.

In a sixth aspect, alone or in combination with one or more of the first through fifth aspects, process 700 includes removing the artificial noise signal from the data signal based at least in part on a secrecy key used by the UE to generate the artificial noise signal, and decoding the data signal.

In a seventh aspect, alone or in combination with one or more of the first through sixth aspects, the power allocation parameter indicates a portion of a total transmission power, for the uplink channel or the sidelink channel, to be allocated for transmitting the data signal by the UE, and an amount of power to be allocated for transmitting the artificial noise signal by the UE is based at least in part on a remaining portion of the total transmission power other than the portion of the total transmission power to be allocated for transmitting the data signal.

In an eighth aspect, alone or in combination with one or more of the first through seventh aspects, the amount of power to be allocated for transmitting the artificial noise signal by the UE is a smaller one of the remaining portion of the total transmission power other than the portion of the total transmission power to be allocated for transmitting the data signal or a maximum power value configured for the artificial noise signal.

In a ninth aspect, alone or in combination with one or more of the first through eighth aspects, the power allocation parameter indicates, to the UE, to transmit the artificial noise signal.

In a tenth aspect, alone or in combination with one or more of the first through ninth aspects, the configuration indicates that the UE is to transmit the artificial noise signal to provide the artificial noise assisted physical layer security for at least one of uplink or sidelink data channels, uplink or sidelink control channels, or sidelink feedback channels.

In an eleventh aspect, alone or in combination with one or more of the first through tenth aspects, the configuration identifies, for each of one or more sidelink resource pools configured for the UE, one or more sidelink channels for which the UE is to transmit the artificial noise signal to provide the artificial noise assisted physical layer security.

In a twelfth aspect, alone or in combination with one or more of the first through eleventh aspects, process 700 includes transmitting, to the UE, an indication of a pattern of symbols in which the UE is to transmit the artificial noise signal.

In a thirteenth aspect, alone or in combination with one or more of the first through twelfth aspects, process 700 includes transmitting, to the UE, an indication of a pattern of resource elements or resource blocks in which the UE is to transmit the artificial noise signal.

In a fourteenth aspect, alone or in combination with one or more of the first through thirteenth aspects, the power allocation parameter indicates, to the UE, to transmit the artificial noise signal, without transmitting the data signal, to provide artificial noise assisted physical layer security for a data signal transmitted by another UE.

In a fifteenth aspect, alone or in combination with one or more of the first through fourteenth aspects, process 700 includes transmitting, to the UE, an angle of departure associated with one or more potential eavesdropping devices.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
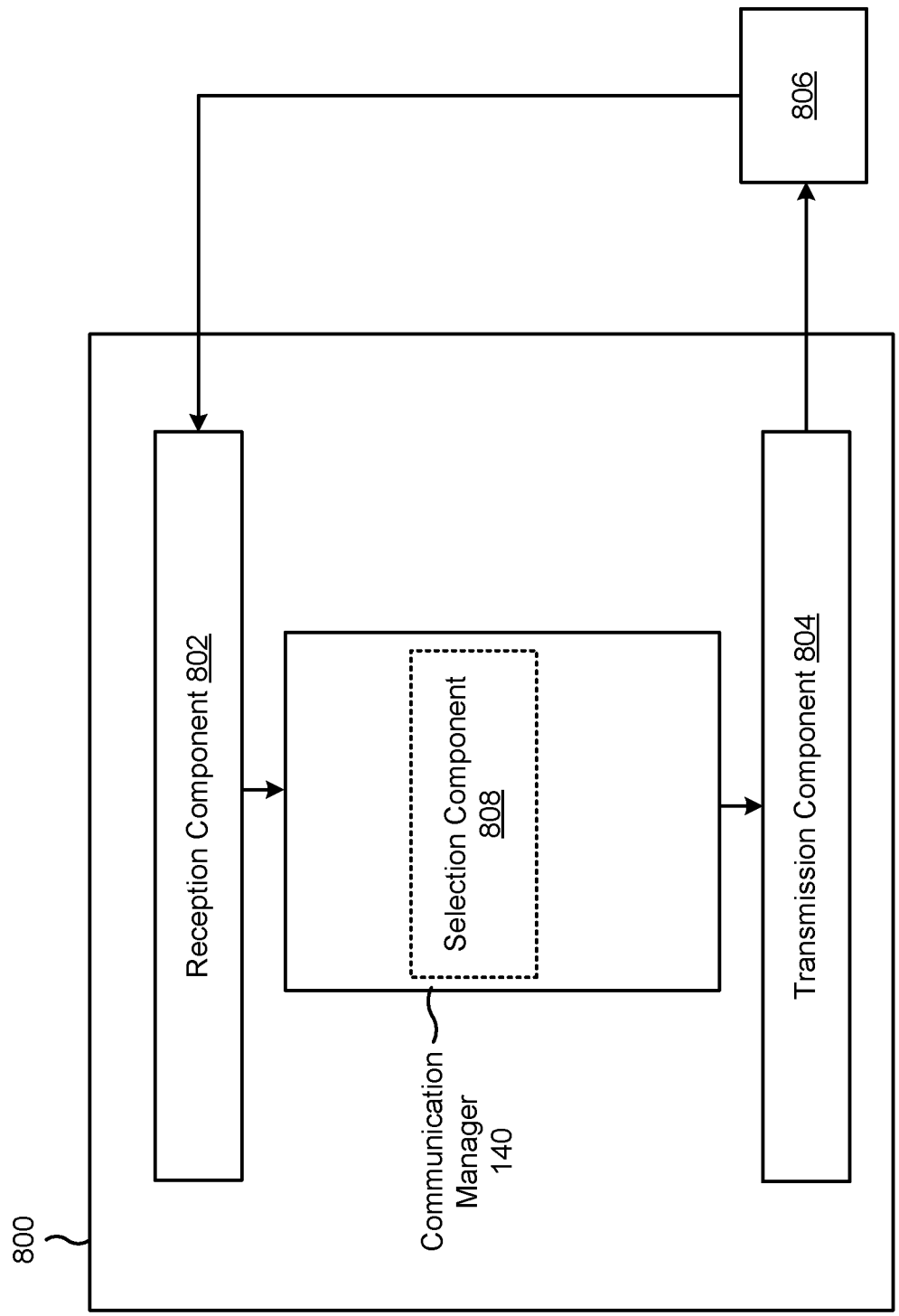
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a selection component 808, among other examples.

In some aspects, the apparatus 800 may be configured to perform one or more operations described herein in connection with FIGS. 4-5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive a configuration associated with artificial noise assisted physical layer security for at least one of an uplink channel or a sidelink channel. The reception component 802 may receive an indication of a power allocation parameter associated with a power allocation between a data signal and an artificial noise signal. The transmission component 804 may transmit, via the uplink channel or the sidelink channel, at least one of the data signal or the artificial noise signal with the power allocation between the data signal and the artificial noise signal based at least in part on the power allocation parameter.

The reception component 802 may receive an indication that enables the artificial noise assisted physical layer security for the at least one of the uplink channel or the sidelink channel.

The reception component 802 may receive an indication of the pattern of symbols.

The selection component 808 may select the pattern of symbols from one or more patterns of symbols configured for a sidelink resource pool.

The transmission component 804 may transmit, to a receiving UE for which the data signal is intended, sidelink control information including an indication of the pattern of symbols.

The reception component 802 may receive an indication of the pattern of resource elements or resource blocks.

The selection component 808 may select the pattern of resource elements or resource blocks from one or more patterns of resource elements or resource blocks configured for the sidelink resource pool.

The transmission component 804 may transmit, to a receiving UE for which the data signal is intended, sidelink control information including an indication of the pattern of resource elements or resource blocks.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
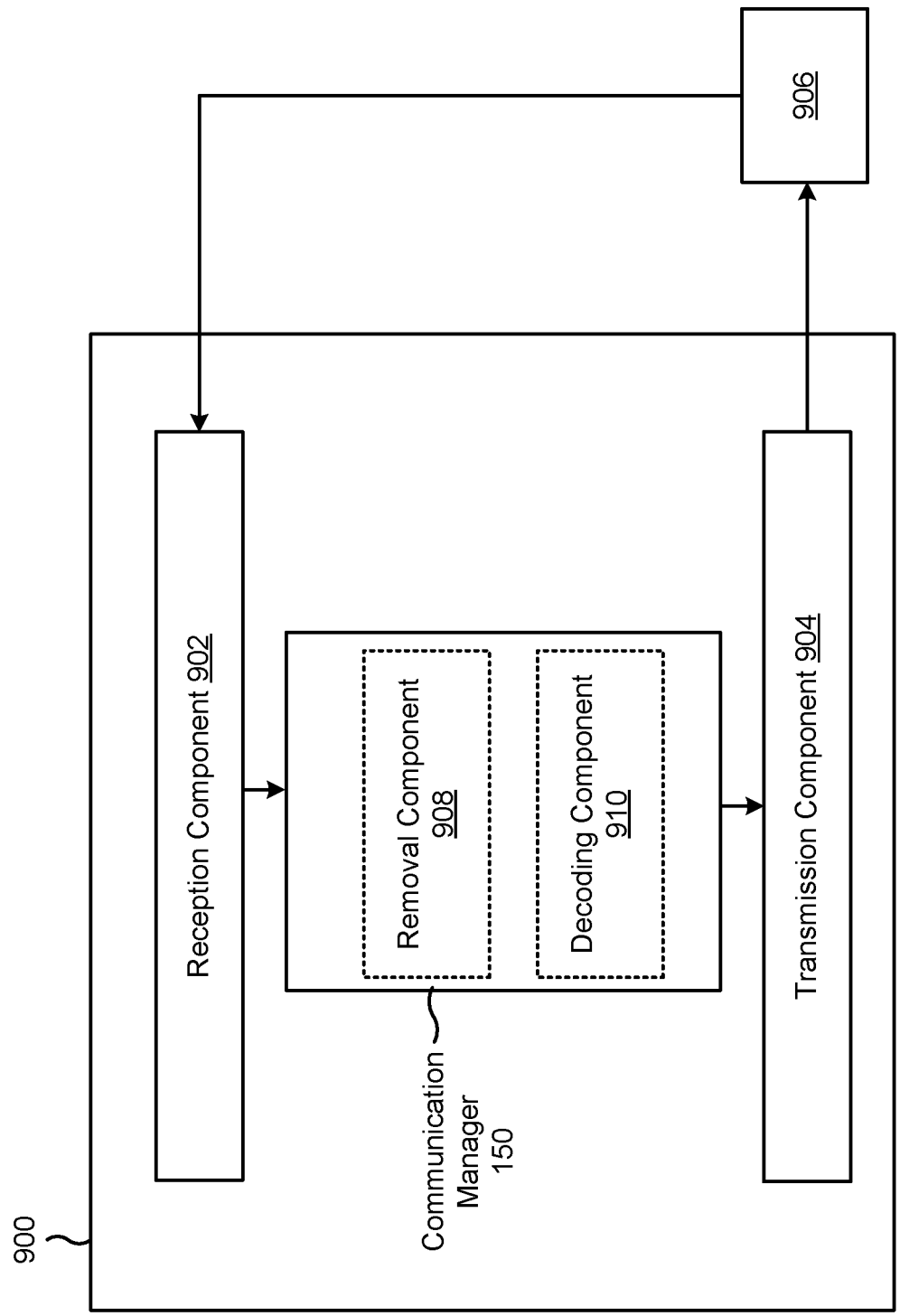

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of a removal component 908 or a decoding component 910, among other examples.

In some aspects, the apparatus 900 may be configured to perform one or more operations described herein in connection with FIGS. 4-5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit, to a UE, a configuration associated with artificial noise assisted physical layer security for at least one of an uplink channel or a sidelink channel. The transmission component 904 may transmit, to the UE, an indication of a power allocation parameter associated with a power allocation between transmitting a data signal on the uplink channel or the sidelink channel and transmitting an artificial noise signal to provide the artificial noise assisted physical layer security for the data signal.

The transmission component 904 may transmit, to another UE, an indication for the other UE to transmit the artificial noise signal to provide the artificial noise assisted physical layer security for the data signal to be transmitted by the UE.

The transmission component 904 may transmit, to the UE, an indication that enables the artificial noise assisted physical layer security for the at least one of the uplink channel or the sidelink channel.

The reception component 902 may receive the data signal and the artificial noise signal, wherein the data signal and the artificial noise signal are transmitted by the UE in the uplink channel with the power allocation between the data signal and the artificial noise signal based at least in part on the power allocation parameter.

The removal component 908 may remove the artificial noise signal from the data signal based at least in part on a secrecy key used by the UE to generate the artificial noise signal.

The decoding component 910 may decode the data signal.

The transmission component 904 may transmit, to the UE, an indication of a pattern of symbols in which the UE is to transmit the artificial noise signal.

The transmission component 904 may transmit, to the UE, an indication of a pattern of resource elements or resource blocks in which the UE is to transmit the artificial noise signal.

The transmission component 904 may transmit, to the UE, an angle of departure associated with one or more potential eavesdropping devices.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a configuration associated with artificial noise assisted physical layer security for at least one of an uplink channel or a sidelink channel; receiving an indication of a power allocation parameter associated with a power allocation between a data signal and an artificial noise signal; and transmitting, via the uplink channel or the sidelink channel, at least one of the data signal or the artificial noise signal with the power allocation between the data signal and the artificial noise signal based at least in part on the power allocation parameter.

Aspect 2: The method of Aspect 1, wherein receiving the configuration comprises: receiving the configuration in at least one of a radio resource control message or a medium access control (MAC) control element.

Aspect 3: The method of any of Aspects 1-2, further comprising: receiving an indication that enables the artificial noise assisted physical layer security for the at least one of the uplink channel or the sidelink channel.

Aspect 4: The method of any of Aspects 1-3, wherein receiving the indication of the power allocation parameter comprises: receiving the indication of the power allocation parameter in at least one of the configuration or dynamic signaling received from a base station.

Aspect 5: The method of any of Aspects 1-4, wherein transmitting the at least one of the data signal or the artificial noise signal comprises: transmitting the data signal and the artificial noise signal with the power allocation between the data signal and the artificial noise signal based at least in part on the power allocation parameter.

Aspect 6: The method of Aspect 5, wherein the power allocation parameter indicates a portion of a total transmission power, for the uplink channel or the sidelink channel, to be allocated for transmitting the data signal, and wherein an amount of power to be allocated for transmitting the artificial noise signal is based at least in part on a remaining portion of the total transmission power other than the portion of the total transmission power to be allocated for transmitting the data signal.

Aspect 7: The method of Aspect 6, wherein the amount of power to be allocated for transmitting the artificial noise signal is a smaller one of the remaining portion of the total transmission power other than the portion of the total transmission power to be allocated for transmitting the data signal or a maximum power value configured for the artificial noise signal.

Aspect 8: The method of any of Aspects 5-7, wherein transmitting the data signal and the artificial noise signal comprises: generating the artificial noise signal based at least in part on a secrecy key shared between the UE and an intended receiving device; and adding the artificial noise signal in a waveform domain over a set of resources in which the data signal is transmitted.

Aspect 9: The method of any of Aspects 5-7, wherein transmitting the data signal and the artificial noise signal comprises: generating the artificial noise signal based at least in part on a secrecy key shared between the UE and an intended receiving device; and adding the artificial noise signal to resource elements in all or a subset of symbols in which the data signal is transmitted.

Aspect 10: The method of any of Aspects 1-9, wherein transmitting the at least one of the data signal or the artificial noise signal comprises: transmitting at least the artificial noise signal.

Aspect 11: The method of Aspect 10, wherein the configuration indicates that the UE is to transmit the artificial noise signal to provide the artificial noise assisted physical layer security for at least one of: uplink or sidelink data channels; uplink or sidelink control channels; or sidelink feedback channels.

Aspect 12: The method of Aspect 11, wherein the configuration identifies, for each of one or more sidelink resource pools configured for the UE, one or more sidelink channels for which the UE is to transmit the artificial noise signal to provide the artificial noise assisted physical layer security.

Aspect 13: The method of any of Aspects 10-12, wherein transmitting at least the artificial noise signal comprises: transmitting the artificial noise signal in symbols associated with the data signal based at least in part on a pattern of symbols.

Aspect 14: The method of Aspect 13, further comprising: receiving an indication of the pattern of symbols.

Aspect 15: The method of Aspect 13, wherein the artificial noise signal is transmitted via a sidelink communication, and wherein the method further comprises: selecting the pattern of symbols from one or more patterns of symbols configured for a sidelink resource pool; and transmitting, to a receiving UE for which the data signal is intended, sidelink control information including an indication of the pattern of symbols.

Aspect 16: The method of any of Aspects 10-15, wherein transmitting at least the artificial noise signal comprises: transmitting the artificial noise signal in resource elements or resource blocks within a bandwidth part or sidelink resource pool based at least in part on a pattern of resource elements or resource blocks.

Aspect 17: The method of Aspect 16, further comprising: receiving an indication of the pattern of resource elements or resource blocks.

Aspect 18: The method of Aspect 16, wherein the artificial noise signal is transmitted via a sidelink communication, and wherein the method further comprises: selecting the pattern of resource elements or resource blocks from one or more patterns of resource elements or resource blocks configured for the sidelink resource pool; and transmitting, to a receiving UE for which the data signal is intended, sidelink control information including an indication of the pattern of resource elements or resource blocks.

Aspect 19: The method of any of Aspects 10-18, wherein transmitting at least the artificial noise signal comprises: transmitting the artificial noise signal, without transmitting the data signal, to provide artificial noise assisted physical layer security for a data signal transmitted by another UE.

Aspect 20: The method of Aspect 19, wherein transmitting the artificial noise signal comprises: transmitting the artificial noise signal in a same uplink bandwidth part or sidelink resource pool as an uplink bandwidth part or sidelink resource pool in which the other UE transmits the data signal.

Aspect 21: The method of any of Aspects 19-20, wherein transmitting the artificial noise signal comprises: performing precoding for the artificial noise signal based at least in part on a precoding matrix indicator or direction indication associated with a direction to a receiving device for which the data signal is intended.

Aspect 22: The method of any of Aspects 19-21, wherein transmitting the artificial noise signal comprises: transmitting the artificial noise signal in a beam direction based at least in part on an indication, received from a base station, of an angle of departure associated with one or more potential eavesdropping devices.

Aspect 23: A method of wireless communication performed by a base station, comprising: transmitting, to a user equipment (UE), a configuration associated with artificial noise assisted physical layer security for at least one of an uplink channel or a sidelink channel; and transmitting, to the UE, an indication of a power allocation parameter associated with a power allocation between transmitting a data signal on the uplink channel or the sidelink channel and transmitting an artificial noise signal to provide the artificial noise assisted physical layer security for the data signal.

Aspect 24: The method of Aspect 23, wherein the power allocation parameter indicates, to the UE, to transmit the data signal, and wherein the method further comprises: transmitting, to another UE, an indication for the other UE to transmit the artificial noise signal to provide the artificial noise assisted physical layer security for the data signal to be transmitted by the UE.

Aspect 25: The method of any of Aspects 23-24, wherein transmitting the configuration comprises: transmitting the configuration in at least one of a radio resource control message or a medium access control (MAC) control element.

Aspect 26: The method of any of Aspects 23-25, further comprising: transmitting, to the UE, an indication that enables the artificial noise assisted physical layer security for the at least one of the uplink channel or the sidelink channel.

Aspect 27: The method of any of Aspects 23-26, wherein transmitting the indication of the power allocation parameter comprises: transmitting the indication of the power allocation parameter to the UE in at least one of the configuration or dynamic signaling.

Aspect 28: The method of any of Aspects 23-27, further comprising: receiving the data signal and the artificial noise signal, wherein the data signal and the artificial noise signal are transmitted by the UE in the uplink channel with the power allocation between the data signal and the artificial noise signal based at least in part on the power allocation parameter.

Aspect 29: The method of Aspect 28, further comprising: removing the artificial noise signal from the data signal based at least in part on a secrecy key used by the UE to generate the artificial noise signal; and decoding the data signal.

Aspect 30: The method of any of Aspects 23-29, wherein the power allocation parameter indicates a portion of a total transmission power, for the uplink channel or the sidelink channel, to be allocated for transmitting the data signal by the UE, and wherein an amount of power to be allocated for transmitting the artificial noise signal by the UE is based at least in part on a remaining portion of the total transmission power other than the portion of the total transmission power to be allocated for transmitting the data signal.

Aspect 31: The method of Aspect 30, wherein the amount of power to be allocated for transmitting the artificial noise signal by the UE is a smaller one of the remaining portion of the total transmission power other than the portion of the total transmission power to be allocated for transmitting the data signal or a maximum power value configured for the artificial noise signal.

Aspect 32: The method of any of Aspects 23-31, wherein the power allocation parameter indicates, to the UE, to transmit the artificial noise signal.

Aspect 33: The method of Aspect 32, wherein the configuration indicates that the UE is to transmit the artificial noise signal to provide the artificial noise assisted physical layer security for at least one of: uplink or sidelink data channels; uplink or sidelink control channels; or sidelink feedback channels.

Aspect 34: The method of Aspect 33, wherein the configuration identifies, for each of one or more sidelink resource pools configured for the UE, one or more sidelink channels for which the UE is to transmit the artificial noise signal to provide the artificial noise assisted physical layer security.

Aspect 35: The method of any of Aspects 32-34, further comprising: transmitting, to the UE, an indication of a pattern of symbols in which the UE is to transmit the artificial noise signal.

Aspect 36: The method of any of Aspects 32-35, further comprising: transmitting, to the UE, an indication of a pattern of resource elements or resource blocks in which the UE is to transmit the artificial noise signal.

Aspect 37: The method of any of Aspects 23, 25-27, or 30-36, wherein the power allocation parameter indicates, to the UE, to transmit the artificial noise signal, without transmitting the data signal, to provide artificial noise assisted physical layer security for a data signal transmitted by another UE.

Aspect 38: The method of Aspect 37, further comprising: transmitting, to the UE, an angle of departure associated with one or more potential eavesdropping devices.

Aspect 39: An apparatus for wireless communication at a device, comprising a processor; memory coupled with the processor; and instructions stored in the memory and executable by the processor to cause the apparatus to perform the method of one or more of Aspects 1-22.

Aspect 40: An apparatus for wireless communication at a device, comprising a processor; memory coupled with the processor; and instructions stored in the memory and executable by the processor to cause the apparatus to perform the method of one or more of Aspects 23-38.

Aspect 41: A device for wireless communication, comprising a memory and one or more processors coupled to the memory, the one or more processors configured to perform the method of one or more of Aspects 1-22.

Aspect 42: A device for wireless communication, comprising a memory and one or more processors coupled to the memory, the one or more processors configured to perform the method of one or more of Aspects 23-38.

Aspect 43: An apparatus for wireless communication, comprising at least one means for performing the method of one or more of Aspects 1-22.

Aspect 44: An apparatus for wireless communication, comprising at least one means for performing the method of one or more of Aspects 23-38.

Aspect 45: A non-transitory computer-readable medium storing code for wireless communication, the code comprising instructions executable by a processor to perform the method of one or more of Aspects 1-22.

Aspect 46: A non-transitory computer-readable medium storing code for wireless communication, the code comprising instructions executable by a processor to perform the method of one or more of Aspects 23-38.

Aspect 47: A non-transitory computer-readable medium storing a set of instructions for wireless communication, the set of instructions comprising one or more instructions that, when executed by one or more processors of a device, cause the device to perform the method of one or more of Aspects 1-22.

Aspect 48: A non-transitory computer-readable medium storing a set of instructions for wireless communication, the set of instructions comprising one or more instructions that, when executed by one or more processors of a device, cause the device to perform the method of one or more of Aspects 23-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
   receive, from a network node, a configuration, identifying at least one of an uplink channel or a sidelink channel, for artificial noise assisted physical layer security;
   receive, from the network node and based at least in part on receiving the configuration, an indication of a power allocation parameter associated with a power allocation between a data signal and an artificial noise signal;
   generate the artificial noise signal based at least in part on a secrecy key shared between the UE and an intended receiving device;
   add the artificial noise signal, in a waveform domain over a set of resources in which the data signal is to be transmitted, or to resource elements in a subset of symbols in which the data signal is to be transmitted; and
   transmit, via the uplink channel or the sidelink channel, the data signal and the artificial noise signal with the power allocation between the data signal and the artificial noise signal based at least in part on the power allocation parameter.

2. The UE of claim 1, wherein the one or more processors are further configured to:
   receive an indication that enables the artificial noise assisted physical layer security for the at least one of the uplink channel or the sidelink channel.

3. The UE of claim 1, wherein the power allocation parameter indicates a portion of a total transmission power, for the uplink channel or the sidelink channel, to be allocated for transmitting the data signal, and wherein an amount of power to be allocated for transmitting the artificial noise signal is based at least in part on a remaining portion of the total transmission power other than the portion of the total transmission power to be allocated for transmitting the data signal.

4. The UE of claim 3, wherein the amount of power to be allocated for transmitting the artificial noise signal is a smaller one of the remaining portion of the total transmission power other than the portion of the total transmission power to be allocated for transmitting the data signal or a maximum power value configured for the artificial noise signal.

5. The UE of claim 1, wherein the one or more processors, to add the artificial noise signal, are configured to:
add the artificial noise signal in the waveform domain over the set of resources in which the data signal is to be transmitted.

6. The UE of claim 1, wherein the one or more processors, to add the artificial noise signal, are configured to:
add the artificial noise signal to resource elements in the subset of symbols in which the data signal is to be transmitted.

7. The UE of claim 1, wherein the configuration indicates that the UE is to transmit the artificial noise signal to provide the artificial noise assisted physical layer security for at least one of:
uplink or sidelink data channels;
uplink or sidelink control channels; or
sidelink feedback channels.

8. The UE of claim 7, wherein the configuration identifies, for each of one or more sidelink resource pools configured for the UE, one or more sidelink channels for which the UE is to transmit the artificial noise signal to provide the artificial noise assisted physical layer security.

9. The UE of claim 1, wherein the one or more processors, to transmit the artificial noise signal, are configured to:
transmit the artificial noise signal in symbols associated with the data signal based at least in part on a pattern of symbols.

10. The UE of claim 9, wherein the one or more processors are further configured to:
receive an indication of the pattern of symbols.

11. The UE of claim 9, wherein the artificial noise signal is transmitted via a sidelink communication, and wherein the one or more processors are further configured to:
select the pattern of symbols from one or more patterns of symbols configured for a sidelink resource pool; and
transmit, to a receiving UE for which the data signal is intended, sidelink control information including an indication of the pattern of symbols.

12. The UE of claim 1, wherein the one or more processors, to transmit the artificial noise signal, are configured to:
transmit the artificial noise signal in the resource elements within a bandwidth part or sidelink resource pool based at least in part on a pattern of resource elements.

13. The UE of claim 12, wherein the one or more processors are further configured to:
receive an indication of the pattern of resource elements.

14. The UE of claim 12, wherein the artificial noise signal is transmitted via a sidelink communication, and wherein the one or more processors are further configured to:
select the pattern of resource elements from one or more patterns of resource elements; and
transmit, to a receiving UE for which the data signal is intended, sidelink control information including an indication of the pattern of resource elements.

15. The UE of claim 1, wherein the one or more the artificial noise signal is transmitted to provide artificial noise assisted physical layer security for a data signal transmitted by another UE.

16. The UE of claim 15, wherein the one or more processors, to transmit the artificial noise signal, are configured to:
transmit the artificial noise signal in a same uplink bandwidth part or sidelink resource pool as an uplink bandwidth part or sidelink resource pool in which the other UE transmits the data signal.

17. The UE of claim 15, wherein the one or more processors, to transmit the artificial noise signal, are configured to:
perform precoding for the artificial noise signal based at least in part on a precoding matrix indicator or direction indication associated with a direction to a receiving device for which the data signal is intended.

18. The UE of claim 15, wherein the one or more processors, to transmit the artificial noise signal, are configured to:
transmit the artificial noise signal in a beam direction based at least in part on an indication, received from a network node, of an angle of departure associated with one or more potential eavesdropping devices.

19. A network node for wireless communication, comprising:
one or more memories; and
one or more processors, coupled to the one or more memories, configured to:
transmit, to a user equipment (UE), a configuration, identifying at least one of an uplink channel or a sidelink channel, for artificial noise assisted physical layer security;
transmit, to the UE based at least in part on transmitting the configuration, an indication of a power allocation parameter associated with a power allocation between transmitting a data signal on the uplink channel or the sidelink channel and transmitting an artificial noise signal to provide the artificial noise assisted physical layer security for the data signal; and
receive the data signal and the artificial noise signal, wherein the data signal and the artificial noise signal are transmitted by the UE in the uplink channel with the power allocation between the data signal and the artificial noise signal based at least in part on the power allocation parameter; and
remove the artificial noise signal from the data signal based at least in part on a secrecy key used by the UE to generate the artificial noise signal; and
decode the data signal.

20. The network node of claim 19, wherein the power allocation parameter indicates, to the UE, to transmit the data signal, and wherein the one or more processors are further configured to:
transmit, to another UE, an indication for the other UE to transmit the artificial noise signal to provide the artificial noise assisted physical layer security for the data signal to be transmitted by the UE.

21. The network node of claim 19, wherein the power allocation parameter indicates a portion of a total transmission power, for the uplink channel or the sidelink channel, to be allocated for transmitting the data signal by the UE, and wherein an amount of power to be allocated for transmitting the artificial noise signal by the UE is based at least in part on a remaining portion of the total transmission power other than the portion of the total transmission power to be allocated for transmitting the data signal.

22. A method of wireless communication performed by a user equipment (UE), comprising:
receiving, from a network node, a configuration, identifying at least one of an uplink channel or a sidelink channel, for artificial noise assisted physical layer security;

receiving, from the network node and based at least in part on receiving the configuration, an indication of a power allocation parameter associated with a power allocation between a data signal and an artificial noise signal;

generating the artificial noise signal based at least in part on a secrecy key shared between the UE and an intended receiving device;

adding the artificial noise signal, in a waveform domain over a set of resources in which the data signal is to be transmitted, or to resource elements in a subset of symbols in which the data signal is to be transmitted; and transmit, via the uplink channel or the sidelink channel, the data signal and the artificial noise signal with the power allocation between the data signal and the artificial noise signal based at least in part on the power allocation parameter.

23. The method of claim 22, wherein the power allocation parameter indicates a portion of a total transmission power, for the uplink channel or the sidelink channel, to be allocated for transmitting the data signal, and wherein an amount of power to be allocated for transmitting the artificial noise signal is based at least in part on a remaining portion of the total transmission power other than the portion of the total transmission power to be allocated for transmitting the data signal.

24. The method of claim 23, wherein the amount of power to be allocated for transmitting the artificial noise signal is a smaller one of the remaining portion of the total transmission power other than the portion of the total transmission power to be allocated for transmitting the data signal or a maximum power value configured for the artificial noise signal.

25. The method of claim 22, wherein adding the artificial noise signal comprises:
adding the artificial noise signal in the waveform domain over the set of resources in which the data signal is to be transmitted.

26. The method of claim 22, wherein adding the artificial noise signal comprises:
adding the artificial noise signal to resource elements in the subset of symbols in which the data signal is to be transmitted.

27. The method of claim 22, further comprising:
receiving an indication that enables the artificial noise assisted physical layer security for the at least one of the uplink channel or the sidelink channel.

28. A method of wireless communication performed by a network node, comprising:
transmitting, to a user equipment (UE), a configuration, identifying at least one of an uplink channel or a sidelink channel, for artificial noise assisted physical layer security;

transmitting, to the UE, an indication of a power allocation parameter associated with a power allocation between transmitting a data signal on the uplink channel or the sidelink channel and transmitting an artificial noise signal to provide the artificial noise assisted physical layer security for the data signal;

receiving the data signal and the artificial noise signal, wherein the data signal and the artificial noise signal are transmitted by the UE in the uplink channel with the power allocation between the data signal and the artificial noise signal based at least in part on the power allocation parameter; and removing the artificial noise signal from the data signal based at least in part on a secrecy key used by the UE to generate the artificial noise signal; and decoding the data signal.

29. The method of claim 28, wherein the power allocation parameter indicates, to the UE, to transmit the data signal, and the method further comprises:
transmitting, to another UE, an indication for the other UE to transmit the artificial noise signal to provide the artificial noise assisted physical layer security for the data signal to be transmitted by the UE.

30. The method of claim 28, wherein the power allocation parameter indicates a portion of a total transmission power, for the uplink channel or the sidelink channel, to be allocated for transmitting the data signal by the UE, and wherein an amount of power to be allocated for transmitting the artificial noise signal by the UE is based at least in part on a remaining portion of the total transmission power other than the portion of the total transmission power to be allocated for transmitting the data signal.

* * * * *